United States Patent
Solow et al.

(10) Patent No.: US 8,396,222 B2
(45) Date of Patent: Mar. 12, 2013

(54) KEY DISTRIBUTION SYSTEM

(75) Inventors: Hillel Solow, Beit Shemesh (IL); Erez Waisbard, Or-Yehuda (IL)

(73) Assignee: NDS Limited, Staines, Middlesex (GB)

( * ) Notice: Subject to any disclaimer, the term of this patent is extended or adjusted under 35 U.S.C. 154(b) by 340 days.

(21) Appl. No.: 12/735,207

(22) PCT Filed: Mar. 3, 2009

(86) PCT No.: PCT/IB2009/050842
§ 371 (c)(1),
(2), (4) Date: Jul. 16, 2010

(87) PCT Pub. No.: WO2009/112966
PCT Pub. Date: Sep. 17, 2009

(65) Prior Publication Data
US 2010/0296655 A1  Nov. 25, 2010

Related U.S. Application Data

(60) Provisional application No. 61/068,712, filed on Mar. 10, 2008.

(51) Int. Cl.
*H04L 9/08* (2006.01)
*H04L 9/00* (2006.01)
*H04L 29/06* (2006.01)
*H04N 7/167* (2006.01)
*H04K 1/00* (2006.01)

(52) U.S. Cl. .......... 380/279; 380/45; 380/201; 380/255; 713/150; 726/32

(58) Field of Classification Search .......... 380/200–201, 380/255, 277–281, 44–45; 713/150; 726/26, 726/32
See application file for complete search history.

(56) References Cited

U.S. PATENT DOCUMENTS

| 4,531,020 A | 7/1985 | Wechselberger et al. |
| 5,426,700 A * | 6/1995 | Berson ........................... 713/186 |

(Continued)

FOREIGN PATENT DOCUMENTS

| JP | 2003-023418 A2 | 1/2003 |
| WO | WO 99/45711 | 9/1999 |

(Continued)

OTHER PUBLICATIONS

Jul. 7, 2009 Communication from International Searching Authority.

(Continued)

*Primary Examiner* — Ashok Patel
*Assistant Examiner* — Kevin Bechtel
(74) *Attorney, Agent, or Firm* — Husch Blackwell LLP

(57) ABSTRACT

A key distribution system for controlling access to content by rendering devices, comprising an epoch module to provide epochs, each epoch including service key periods, a service key module to provide a batch of service keys, a group module to provide group keys for each epoch such that each rendering device is assigned a group key grouping together the devices having the same group key, thereby defining groups, in different epochs the devices are grouped differently, an encryption module to encrypt, for each epoch, each service key in the batch of service keys, individually with each group key yielding a plurality of group-key-encrypted service keys from each service key, and a delivery module to distribute to the devices, for each one of the epochs, the group-key-encrypted service keys for the batch of service keys and the group keys of the one epoch. Related apparatus and methods are also described.

21 Claims, 13 Drawing Sheets

U.S. PATENT DOCUMENTS

| | | |
|---|---|---|
| 6,629,243 B1 | 9/2003 | Kleinman et al. |
| 6,880,081 B1 | 4/2005 | Itkis |
| 2002/0170053 A1* | 11/2002 | Peterka et al. ............... 725/31 |
| 2003/0087652 A1 | 5/2003 | Simon et al. |
| 2003/0172262 A1 | 9/2003 | Curry |
| 2003/0188188 A1* | 10/2003 | Padmanabhan et al. ...... 713/201 |
| 2004/0250072 A1* | 12/2004 | Ylonen ........................ 713/170 |
| 2006/0080259 A1* | 4/2006 | Wajs ............................. 705/51 |
| 2006/0206708 A1 | 9/2006 | Son et al. |
| 2007/0198839 A1 | 8/2007 | Carle et al. |
| 2008/0019528 A1 | 1/2008 | Kneissler |
| 2008/0025517 A1* | 1/2008 | Itkis .............................. 380/286 |
| 2008/0165958 A1* | 7/2008 | Matsushita ..................... 380/44 |
| 2008/0219436 A1* | 9/2008 | Chen et al. ..................... 380/30 |
| 2008/0240446 A1* | 10/2008 | Long et al. .................... 380/279 |
| 2009/0097659 A1* | 4/2009 | Candelore .................... 380/278 |

FOREIGN PATENT DOCUMENTS

| | | |
|---|---|---|
| WO | WO 2005/004391 A1 | 1/2005 |
| WO | WO 2006/111949 A2 | 10/2006 |

OTHER PUBLICATIONS

Aslihan Celik et al., "A Scalable Approach for Subscription-Based Information Commerce," *Proceedings of The Second International Workshop on Advanced Issues of E-Commerce and Web-Based Information Systems*, pp. 50-57 (IEEE, 2000).

Claudiu Duma, "Security and Efficiency Tradeoffs in Multicast Group Key Management" (Linköpings Studies in Science and Technology, Thesis No. 1054, Nov. 2003).

Firdous Kausar et al., "Secure Group Communication With Self-Healing and Rekeying in Wireless Sensor Networks" (Springer-Verlag 2007).

\* cited by examiner

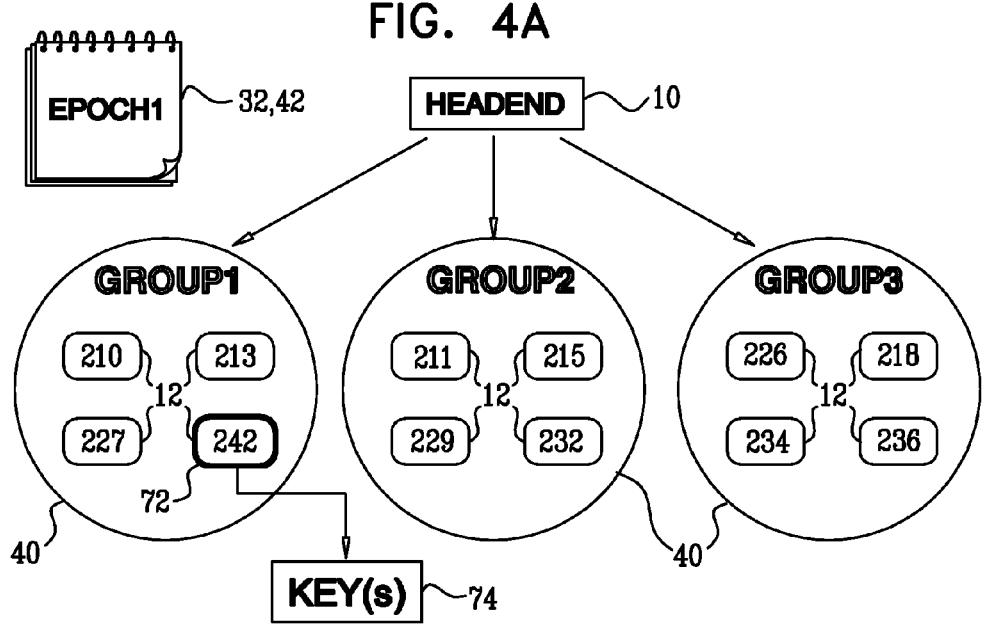
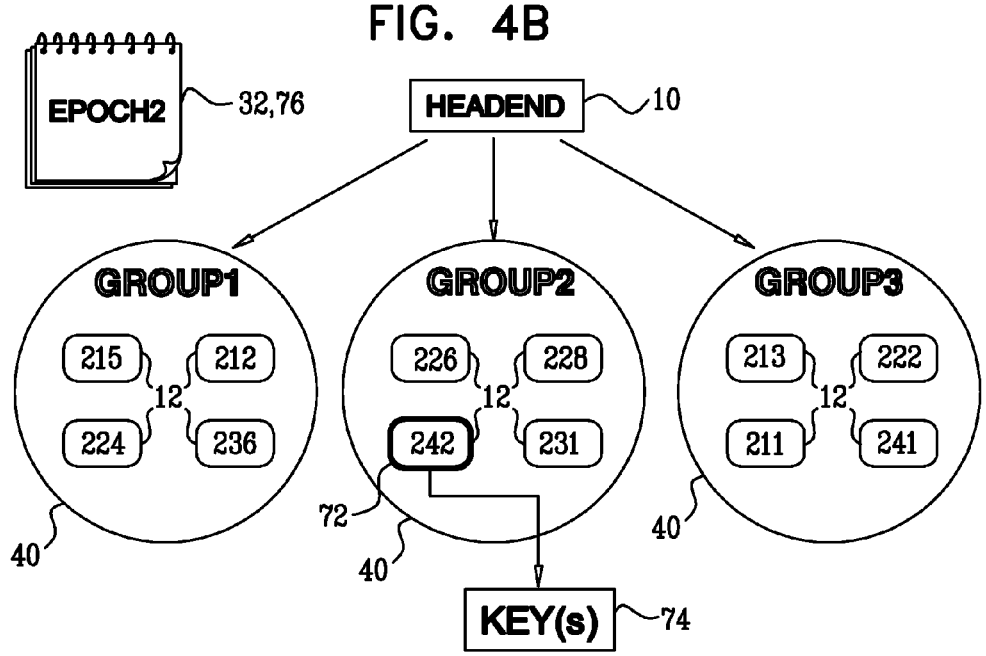

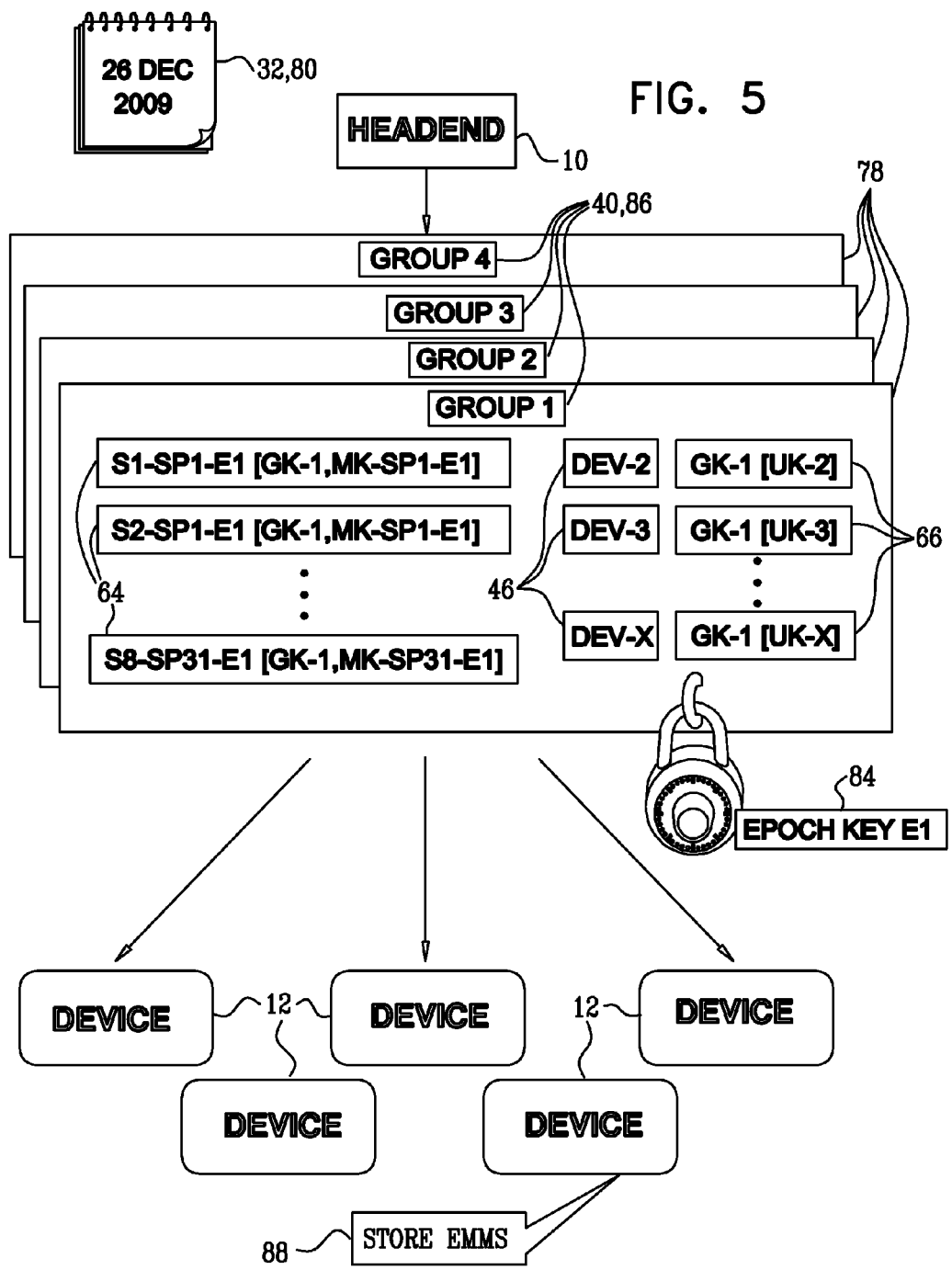

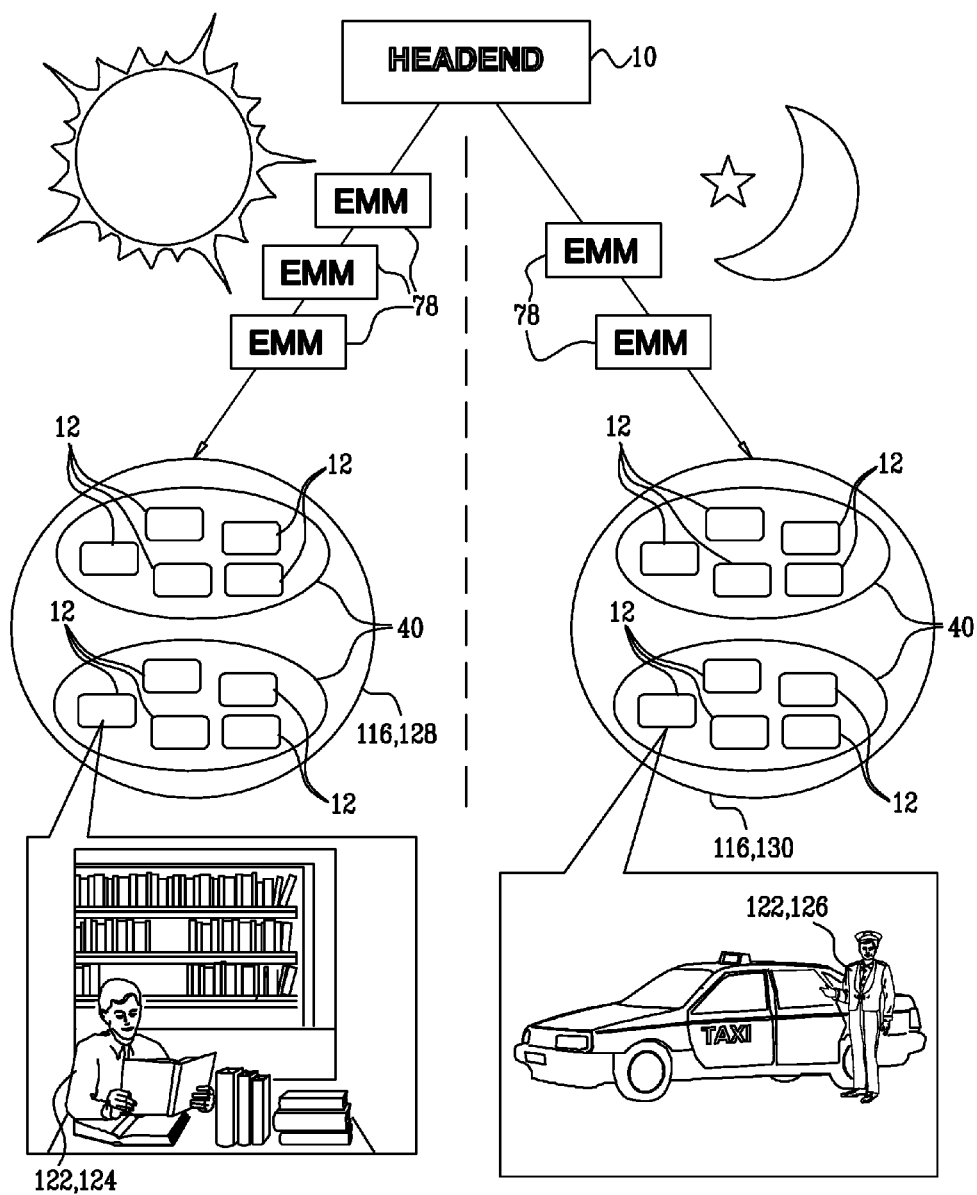

KEY DISTRIBUTION SYSTEM

RELATED APPLICATION INFORMATION

The present application is a 35 USC §371 application of PCT/IB2009/050842, filed on 3 Mar. 2009 and entitled "Key Distribution System", which was published on 17 Sep. 2009 in the English language with International Publication Number WO 2009/112966 and which relies for priority on U.S. Provisional Patent Application Ser. No. 61/068,712 of Solow, et al., filed 10 Mar. 2008.

FIELD OF THE INVENTION

The present invention relates to key distribution in general, and particularly, but not exclusively, to key distribution useful in conjunction with content distribution systems.

BACKGROUND OF THE INVENTION

The following references are believed to represent the state of the art:
U.S. Pat. No. 6,880,081 to Itkis;
US Published Patent Application 2003/0172262 of Curry;
PCT Published Patent Application WO 2006/111949 of NDS Limited; and
Abstract of Japanese Published Patent Application 2003-023418.

SUMMARY OF THE INVENTION

The present invention, in certain embodiments thereof, seeks to provide an improved key distribution system.

By way of introduction, content delivery systems typically secure content so that only those paying for the content are able to consume the content. The content is typically secured with one or more cryptographic keys. The keys be updated every cryptoperiod. Subscribers of the content are supplied with the relevant keys and/or key generation information to enable the subscribers to consume the content.

Updating the decryption keys and/or key generation information more frequently provides greater security for the content but requires more bandwidth to send the keys/key generation information to the subscribers.

Transmitting keys/key generation information in bulk for many future cryptoperiods may provide bandwidth savings, but may also result in reduced security.

Grouping devices together for security purposes, for example, but not limited to, using group keys, may also provide bandwidth savings, but may result in reduced security due to group members colluding, by way of example only.

It appears that there is a tradeoff between content security and bandwidth limitations.

The system of the present invention, in embodiments thereof, seeks to provide a key distribution system which provides a high level of content security while providing efficient use of available bandwidth, There is thus provided in accordance with an embodiment of the present invention There is also provided in accordance with still another embodiment of the present invention a key distribution system for controlling access to content by a plurality of rendering devices, including an epoch module to provide a plurality of epochs, each of the epochs including a plurality of service key periods, a service key module to provide a plurality of service keys so that, for each one of the epochs, a batch of the service keys is provided for employment in decryption of the content across the service key periods of the one epoch, a group module to provide a plurality of group keys for each of the epochs such that for each of the epochs, each of the rendering devices is assigned one of the group keys such that more than one of the rendering devices may be assigned a same one of the group keys, for each of the epochs, the assignment of the group keys groups together the rendering devices having the same one group key, thereby defining a plurality of groups, each of the service keys is valid across all the groups, and in different ones of the epochs, the rendering devices are grouped differently, an encryption module to encrypt, for each of the epochs, each of the service keys, in the batch of the service keys with each of the group keys, such that each of the service keys is individually encrypted with a different one of the group keys yielding a plurality of group-key-encrypted service keys from each of the service keys, and a delivery module to distribute to the rendering devices, for each one of the epochs, the group-key-encrypted service keys for the batch of the service keys and the group keys of the one epoch.

Further in accordance with an embodiment of the present invention the service key module is operative to provide the service keys so that, for each one of the epochs, the batch of the service keys is provided for employment in decryption of the content for a plurality of services across the service key periods of each one of the epochs such that a different one of the service keys in the batch is valid for each different combination of the services and the service key periods.

Still further in accordance with an embodiment of the present invention the delivery module is operative to distribute, for each one of the groups, the batch of the service keys of the one epoch to the rendering devices of the one group in at least one key package.

Additionally in accordance with an embodiment of the present invention the delivery module is operative to include at least one additional service key of an epoch after the one epoch in the at least one key package so as to provide a grace period for content access after the end of the one epoch.

Moreover in accordance with an embodiment of the present invention the delivery module is operative to distribute, for each one of the groups, the group keys of the one epoch to the rendering devices of the one group in the at least one key package.

Further in accordance with an embodiment of the present invention the epoch module is operative to provide, for each one of the epochs, an epoch key, the encryption module being operative to encrypt, for each one of the groups, the at least one key package of the one group using the epoch key of the one epoch.

Still further in accordance with an embodiment of the present invention the delivery module is operative to include an identification in the at least one key package of the one group, the identification identifying the at least one key package of the one group as being associated with the one group.

Additionally in accordance with an embodiment of the present invention the group module is operative to assign the group keys to the rendering devices randomly/pseudo-randomly.

Moreover in accordance with an embodiment of the present invention the rendering devices are operative to determine to which of the groups the rendering devices belong by employing a function having parameters, and the delivery module is operative to distribute the function and/or the parameters to the rendering devices.

Further in accordance with an embodiment of the present invention the function includes a hash function.

Still further in accordance with an embodiment of the present invention the function is function of at least one of the following a user key and a device ID.

Additionally in accordance with an embodiment of the present invention, the system includes a traitor identifier to identify a traitor device of the rendering devices based on the traitor device distributing, at least one of the group-key-encrypted service keys and/or at least one of the group keys.

Moreover in accordance with an embodiment of the present invention, the system includes a period master key module to provide for each one of the service key periods in the one epoch a different period master key, the encryption module being operative to further encrypt each one of the group-key-encrypted service keys using the period master key of the one service key period of the one group-key encrypted service key being encrypted.

Further in accordance with an embodiment of the present invention the delivery module is operative to distribute, for each one of the service key periods, the period master key for the one service key period not before the start of a service key period immediately prior to the one service key period.

Still further in accordance with an embodiment of the present invention the delivery module is operative to distribute, for each one of the service key periods, the period master key for the one service key period not before the start of the one service key period.

Additionally in accordance with an embodiment of the present invention the period master key module is operative to provide the period master key for each one of the service key periods such that the period master key for the one service key period is the same across all of the groups and across all of the services.

Moreover in accordance with an embodiment of the present invention each of the rendering devices is associated with a different user key, the user key of each of the rendering devices is associated with one of the group keys, the encryption module is operative to encrypt, for each one of the rendering devices, the one group key of the one rendering device using the user key of the one rendering device, yielding a user-key-encrypted group key for each of the rendering devices, and the delivery module is operative to distribute to the rendering devices the user-key-encrypted group key of each of the rendering devices.

Further in accordance with an embodiment of the present invention each of the rendering devices has a unique identification, and the delivery module is operative to distribute at least some of the user-key-encrypted group keys with the unique identification identifying the rendering devices associated with the at least some user-key-encrypted group keys.

Still further in accordance with an embodiment of the present invention at least some of the user-key-encrypted group keys are associated with at least some of the rendering devices, and the delivery module is operative to distribute the at least some user-key-encrypted group keys without identifying the at least some rendering devices of the at least some user-key-encrypted group keys such that the at least some rendering devices need to identify which one of the at least some user-key-encrypted group keys is associated with which one of the at least some rendering devices by trial and error decryption of the at least some user-key-encrypted group keys.

Additionally in accordance with an embodiment of the present invention the delivery module is operative to distribute verification data to the at least some rendering devices, so that the at least some rendering devices check a result of the trial and error decryption against the verification data.

Moreover in accordance with an embodiment of the present invention the group module is operative to create a plurality of supergroups, one of the supergroups including the plurality of groups for the rendering devices, another one of the supergroups including a plurality of other groups for a plurality of other rendering devices, the group module is operative to provide a plurality of other group keys for each of the epochs thereby defining the other groups, in different ones of the epochs the other rendering devices are grouped differently, the encryption module is operative to encrypt, for each of the epochs, each of the service keys in the batch of the service keys with each of the other group keys, such that each one of the service keys is individually encrypted with a different one of the other group keys yielding a plurality of other-group-key-encrypted service keys from each one of the service keys, and the delivery module is operative to distribute the other-group-key-encrypted service keys for the batch of the service keys and the other group keys of the one epoch to the other rendering devices a first delivery schedule.

Further in accordance with an embodiment of the present invention the delivery module is operative to distribute the group-key-encrypted service keys for the batch of the service keys and the group keys of the one epoch to the rendering devices a second delivery schedule, and the first delivery schedule is different from the second delivery schedule.

Still further in accordance with an embodiment of the present invention the first delivery schedule has a higher delivery frequency than the second delivery schedule.

Additionally in accordance with an embodiment of the present invention the group module is operative to create a plurality of supergroups, one of the supergroups including the plurality of groups for the rendering devices, another one of the supergroups including a plurality of other groups for a plurality of other rendering devices, the epoch module is operative to provide a plurality of other epochs, each of the other epochs including a number of the service key periods, the epochs commencing a plurality of first start dates, the other epochs commencing a plurality of second start dates, the first start dates being different from the second start dates, the service key module is operative to provide, for each of the other epochs, another batch of the service keys, the group module is operative to provide a plurality of other group keys for each of the other epochs thereby defining the other groups, in different ones of the other epochs the other rendering devices are grouped differently, the encryption module is operative to encrypt, for each of the other epochs, each of the service keys in the other batch of the service keys with each of the other group keys, such that each of the service keys of the other batch is individually encrypted with a different one of the other group keys yielding a plurality of other-group-key-encrypted service keys from each one of the service keys of the other batch, and the delivery module is operative to distribute, for each one of the other epochs, the other-group-key-encrypted service keys for the other batch of the service keys and the other group keys of the one epoch to the other rendering devices.

There is also provided in accordance with still another embodiment of the present invention a key distribution system for controlling access to content by a plurality of rendering devices, each of the rendering devices having a user with at least one user characteristic, the system including a service key module to provide a batch of service keys for employment in decryption of the content by the rendering devices, a group module to group together the rendering devices into a plurality of groups the at least one user characteristic of the user of each of the rendering devices, and a delivery module to distribute the batch of service keys periodically to the rendering devices a different schedule for different ones of the groups.

There is also provided in accordance with still another embodiment of the present invention a key distribution system for controlling access to content by a plurality of rendering devices, the system including a service key module to provide a batch of service keys for employment in decryption of the content by the rendering devices, a group module to group together the rendering devices into a plurality of groups, and a delivery module to distribute the batch of service keys periodically to the rendering devices with a different frequency for different ones of the groups.

There is also provided in accordance with still another embodiment of the present invention a key distribution system for controlling access to content by a plurality of rendering devices, the system including a group module to group together the rendering devices into a plurality of groups, an epoch module is operative to provide a plurality of epochs, the epochs commencing on a different start date for different ones of the groups, a service key module to provide a batch of service keys for employment in decryption of the content by the rendering devices in each of the epochs, and a delivery module to distribute the batch of the service keys in each of the epochs to the rendering devices.

Moreover in accordance with an embodiment of the present invention the groups are supergroups, each of the supergroups including a plurality of subgroups, each of the subgroups of each of the supergroups in each of the epochs being associated with a different subgroup key.

Further in accordance with an embodiment of the present invention one of the rendering devices is transferred from one of the groups to another one of the groups.

There is also provided in accordance with still another embodiment of the present invention a method performed by a first rendering device, the method including receiving a plurality of group keys in a plurality of key packages, the group keys being associated with a plurality of groups of rendering devices, each of the key packages including a group indication to identify the groups of the group keys in the key packages, receiving at least one of a function having at least one parameter, and the at least one parameter, employing the function to determine which of the groups the first rendering device belongs to.

Still further in accordance with an embodiment of the present invention the function is function of at least one of the following a user key and a device ID.

There is also provided in accordance with still another embodiment of the present invention a method performed by a first rendering device, the method including receiving a plurality of user-key-encrypted group keys associated with a plurality of rendering devices, each of the rendering devices is associated with a different user key, the user key of each of the rendering devices is associated with one of a plurality of group keys, the user-key-encrypted group keys are produced by encrypting, for each one of the rendering devices, the one group key of the one rendering device using the user key of the one rendering device, and identifying which one of the user-key-encrypted group keys is associated with the first rendering device by trial and error decryption of the user-key-encrypted group keys.

Additionally in accordance with an embodiment of the present invention, the method includes receiving verification data, wherein the identifying includes checking a result of the trial and error decryption against the verification data.

There is also provided in accordance with still another embodiment of the present invention a key distribution method for controlling access to content by a plurality of rendering devices, including providing a plurality of epochs, each of the epochs including a plurality of service key periods, providing a plurality of service keys so that, for each one of the epochs, a batch of the service keys is provided for employment in decryption of the content across the service key periods of the one epoch, providing a plurality of group keys for each of the epochs such that for each of the epochs, each of the rendering devices is assigned one of the group keys such that more than one of the rendering devices may be assigned a same one of the group keys, for each of the epochs, the assignment of the group keys groups together the rendering devices having the same one group key, thereby defining a plurality of groups, each of the service keys is valid across all the groups, and in different ones of the epochs, the rendering devices are grouped differently, encrypting, for each of the epochs, each of the service keys, in the batch of the service keys with each of the group keys, such that each of the service keys is individually encrypted with a different one of the group keys yielding a plurality of group-key-encrypted service keys from each of the service keys, and distributing to the rendering devices, for each one of the epochs, the group-key-encrypted service keys for the batch of the service keys and the group keys of the one epoch.

There is also provided in accordance with still another embodiment of the present invention a key distribution method for controlling access to content by a plurality of rendering devices, each of the rendering devices having a user with at least one user characteristic, the method including providing a batch of service keys for employment in decryption of the content by the rendering devices, grouping together the rendering devices into a plurality of groups the at least one user characteristic of the user of each of the rendering devices, and distributing the batch of service keys periodically to the rendering devices a different schedule for different ones of the groups.

There is also provided in accordance with still another embodiment of the present invention a key distribution method for controlling access to content by a plurality of rendering devices, the method including providing a batch of service keys for employment in decryption of the content by the rendering devices, grouping together the rendering devices into a plurality of groups, and distributing the batch of service keys periodically to the rendering devices with a different frequency for different ones of the groups.

There is also provided in accordance with still another embodiment of the present invention a key distribution method for controlling access to content by a plurality of rendering devices, the method including grouping together the rendering devices into a plurality of groups, providing a plurality of epochs, the epochs commencing on a different start date for different ones of the groups, providing a batch of service keys for employment in decryption of the content by the rendering devices in each of the epochs, and distributing the batch of the service keys in each of the epochs to the rendering devices.

BRIEF DESCRIPTION OF THE DRAWINGS

The present invention will be understood and appreciated more fully from the following detailed description, taken in conjunction with the drawings in which:

FIG. 4a is a partly pictorial, partly block diagram view of group assignment in a first epoch in the system of FIG. 1;

FIG. 4b is a partly pictorial, partly block diagram view of group assignment in a second epoch in the system of FIG. 1;

FIG. 5 is a partly pictorial, partly block diagram view showing the distribution of key packages with direct addressing prior to the start of an epoch in the system of FIG. 1;

FIG. 13 is a partly pictorial, partly block diagram view showing a plurality of supergroups having different user characteristics in the system of FIG. 1.

DETAILED DESCRIPTION OF AN EMBODIMENT

Figure 1:
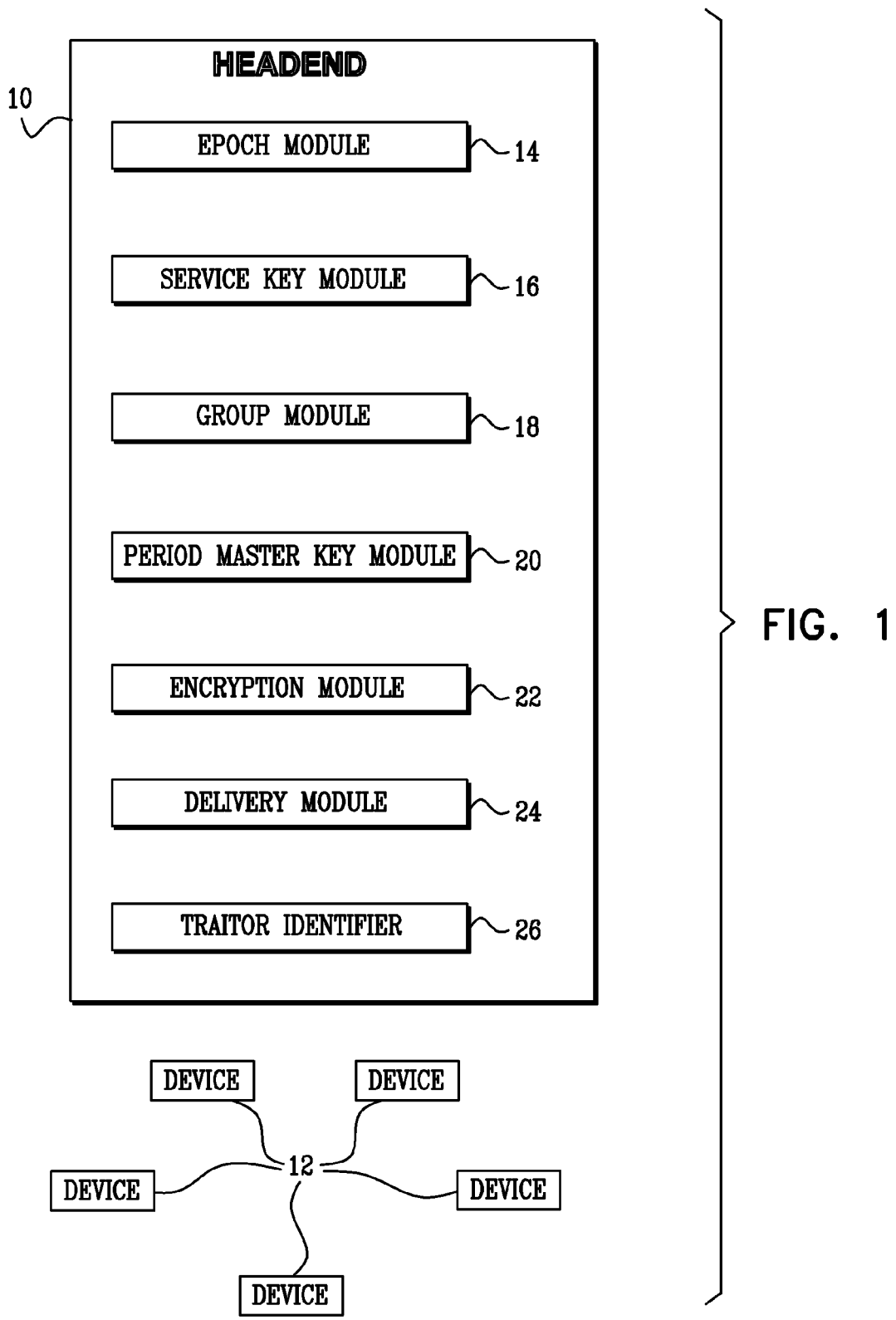
FIG. 1 is a block diagram view of a key distribution system constructed and operative in accordance with an embodiment of the present invention.

Reference is now made to FIG. 1, which is a block diagram view of a key distribution system 10 constructed and operative in accordance with an embodiment of the present invention.

The key distribution system 10 is operative for controlling access to content (not shown) by a plurality of rendering devices 12.

The key distribution system 10 is typically implemented at a broadcaster Headend. It will be appreciated by those ordinarily skilled in the art that a Headend is used by way of example only, and that the present invention is not limited to a particular type of key server, but rather includes any suitable device, for example, but not limited to, a video-on-demand (VOD) server or other suitable processor.

The rendering devices 12 may include any suitable rendering device, for example, but not limited to, a set-top box, a computer, television, a mobile device such as a mobile telephone, a mobile television and a mobile computing device.

The content is typically broadcast by the Headend. However, it will be appreciated by those ordinarily skilled in the art that the content may be distributed by any other suitable content server.

Content and/or keys and other data may be delivered from the key distribution system 10 to the rendering devices 12 by any suitable communication system/method for example, but not limited to, cable, satellite, Internet protocol, terrestrial communication or telephone line or any suitable communication thereof.

The key distribution system 10 typically includes an epoch module 14, a service key module 16, a group module 18, a period master key module 20, an encryption module 22, a delivery module 24 and a traitor identifier 26.

Figure 2:
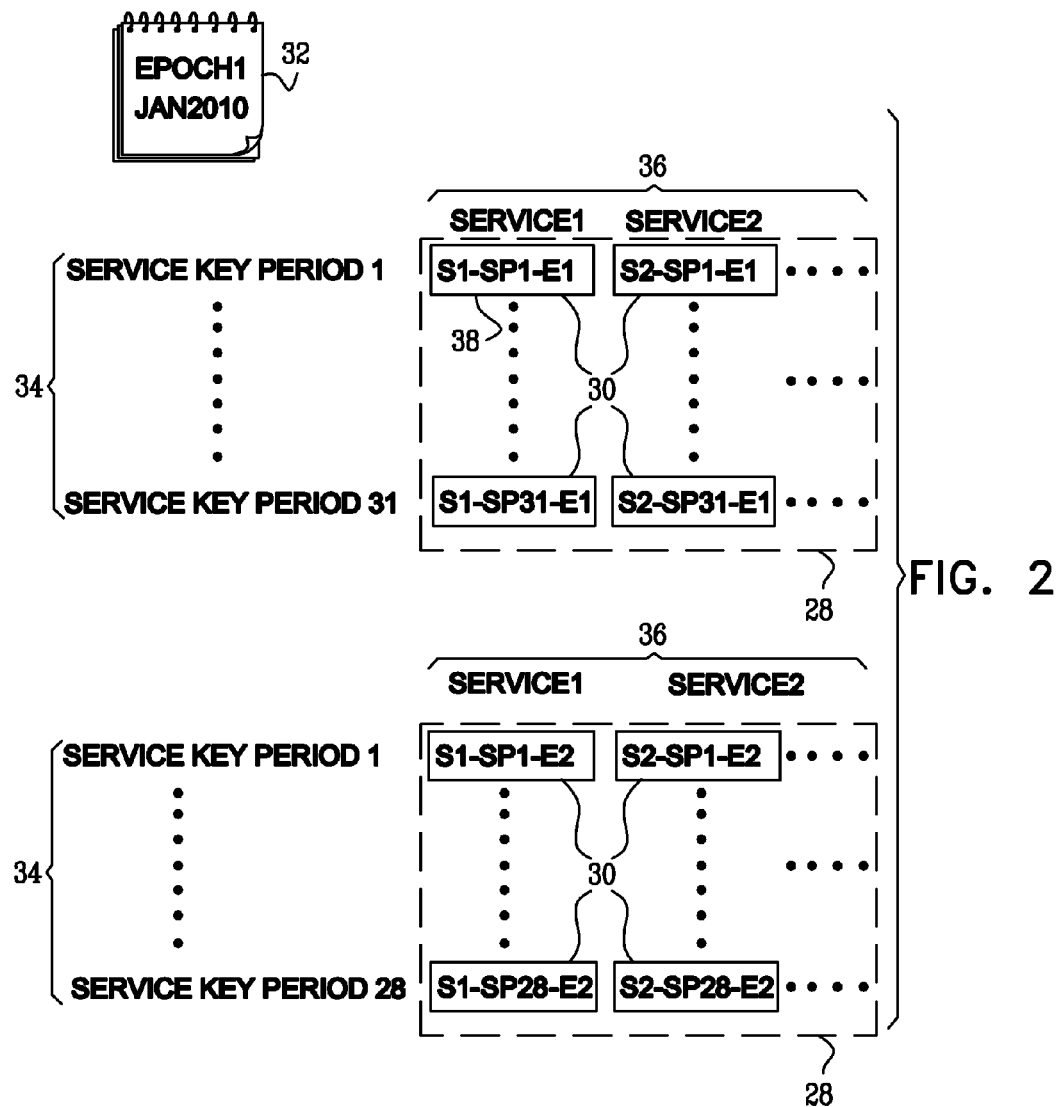
FIG. 2 is a partly pictorial, partly block diagram view of service keys provided by the system of FIG. 1.

Reference is now made to FIG. 2, which is a partly pictorial, partly block diagram view of a plurality of service keys 30 provided by the system 10 of FIG. 1.

The epoch module 14 (FIG. 1) is typically operative to provide a plurality of epochs 32. Each epoch 32 includes a plurality of service key periods 34. The length of each epoch 32 may be any suitable time period, for example, but not limited to, 1 day, 1 week, 2 weeks or 1 month. The length of each service key period 34 may be any suitable time period, for example, but not limited to, 1 hour, 1 day, 2 days or 1 week. However, it will be appreciated by those ordinarily skilled in the art that that the length of the epochs 32 and the service key periods 34 may be chosen to be any suitable length based on operational considerations in a given system.

In the example of FIG. 2, two epochs 28 are shown, EPOCH1 and EPOCH2. The length of each epoch 32 is one month. EPOCH1 is for January 2010 and EPOCH2 is for February 2010. The length of each service key period 34 is one day. Therefore, EPOCH1 includes 31 service key periods 34 and EPOCH2 includes 28 service key periods 34.

The service key module 16 (FIG. 1) is typically operative to provide a batch 28 of the service keys 30 for each epoch 32. The service keys 30 for any epoch 32 are provided for employment in decryption of the content across the service key periods 34 for that epoch 32. The service keys 30 in one batch 28 are typically different to the service keys 30 in another batch 28.

The content may be available for consumption via a plurality of services 36. In the context of a television environment each TV channel may be associated with a different service 36. Alternatively, each service 36 may be associated with a group of channels. Dividing content consumption into a plurality of services may also enable selling the different services separately or as part of a package with other services to users/viewers.

Therefore, the service key module 16 (FIG. 1) is typically operative to provide the service keys 30 so that, for any epoch 32, the batch 28 of the service keys 30 is provided for employment in decryption of the content for each of the services 36 across the service key periods 34 of that epoch 32 such that a different service key 30 in the batch 28 is valid for each different combination of the services 30 and the service key periods 34 in that epoch 32.

In other words, each service 36 has a different service key 30 for each service key period 34 in each epoch 32.

FIG. 2 shows two services 36, service 1 and service 2. In EPOCH1, service 1 has a service key 38 for service key period 1, labeled "S1-SP1-E1". The notation used to represent service key 38 shows "S1" which indicates service 1, followed by "SP1" which indicates service key period 1, followed by "E1" which indicates EPOCH1. The other service keys 30 shown in FIG. 2 are similarly labeled. For the sake of clarity, only two services 36 are shown, and only the service keys 30 for the first and last service key periods 34 of each epoch 32 are shown. It will be appreciated by those ordinarily skilled in the art that there may be any suitable number of services 36 and any suitable number of service key periods 34 per epoch 32.

The content is typically protected so that the content can only be decrypted with a content decryption key made available to the rendering devices 12 (FIG. 1). For security reasons the content decryption key is changed every cryptoperiod, for example, but not limited to, daily or even a few seconds. For example, in digital pay-TV systems it is common to change the decryption key every 10 to 30 seconds.

In some cases, each decryption key may be derived from one or more messages (not shown), for example, but not limited to, an entitlement control message (ECM) which is sent periodically by the key distribution system 10 to the rendering devices 12 and/or an entitlement management message (EMM) described below in more detail with reference to FIGS. 5 and 6. Each ECM may include information for deriving the decryption key for one cryptoperiod or for deriving the decryption keys for more than one cryptoperiod. Each ECM is typically encrypted prior to distribution by the key distribution system 10 using the service key 30 valid for the cryptoperiod(s) covered by the ECM being encrypted. Each service key period 34 typically includes many cryptoperiods when ECMs are used for deriving the decryption keys.

It will be appreciated by those ordinarily skilled in the art that an ECM is used by way of example only, and that the present invention is not limited to a particular type of content security message, but rather includes any suitable message for providing content security features such as decryption key derivation information.

In other cases, the service keys 30 may serve as the content decryption keys. In such a case, the cryptoperiod of the decryption keys is the same as the service key period 34.

As will be described with reference to FIGS. 3-13, the service keys 30 for each epoch 32 are typically encrypted and packaged in one or more bundles prior to sending to the rendering devices 12 (FIG. 1) thereby providing significant bandwidth savings by utilizing key bundling.

Figure 3:
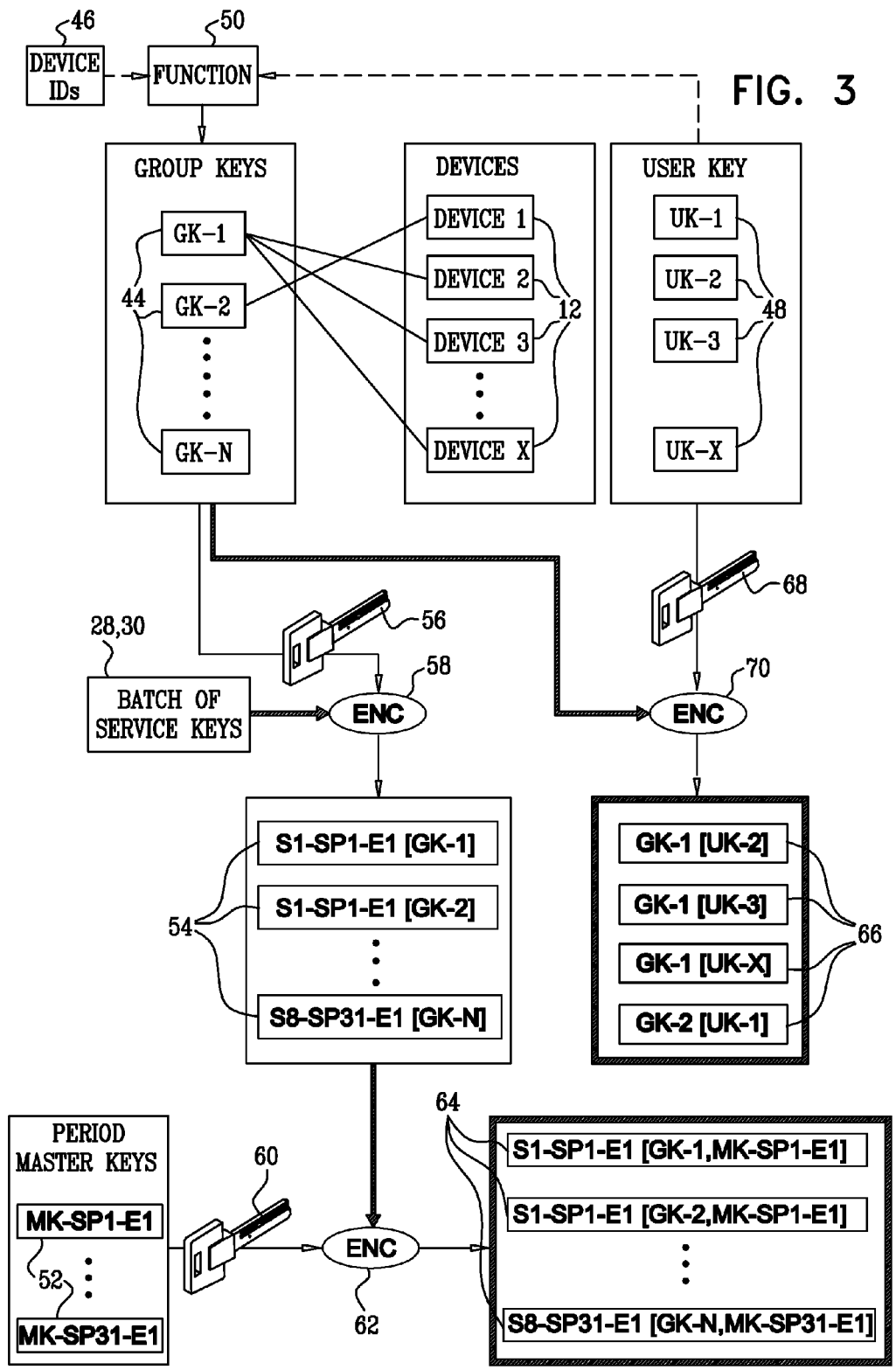
FIG. 3 is a partly pictorial, partly block diagram view of key provision and encryption in the system of FIG. 1.

Reference is now made to FIG. 3, which is a partly pictorial, partly block diagram view of key provision and encryption in the system 10 of FIG. 1. Reference is also made to FIG. 4a, which is a partly pictorial, partly block diagram view of group assignment in a first epoch 42 in the system 10 of FIG. 1.

The rendering devices 12 are typically grouped in a plurality of groups 40 together for the purposes of key distribution as shown in FIG. 4a. Grouping the devices 12 can be particularly useful in reducing the processing involved in preparing the service keys 30 for distribution as well as reducing the bandwidth required to distribute the service keys 30 as will be described below in more detail.

The group module 18 (FIG. 1) is typically operative to provide a plurality of group keys 44 for each of the epochs 32 such that for each epoch 32, each rendering device 12 is assigned one group key 44 so that more than one of the rendering devices 12 may be assigned the same group key 44. For example, in FIG. 3, device 2, device 3 and device X are each assigned group key GK-1. For each epoch 32, the assignment of the group keys 44 groups together the rendering devices 12 having the same group key 44, thereby defining the groups 40. So in the example of FIG. 1, device 2, device 3 and device X are all assigned group key GK-1 and therefore, device 2, device 3 and device X all belong to the same group which is group 1.

The group module 18 is generally operative to assign the group keys 44 to the rendering devices 12 randomly or pseudo-randomly.

Whether the group keys 44 are first assigned to the rendering devices 12 thereby defining the membership of the groups 40, or whether the membership of the groups 40 is first determined and then the group keys 44 are assigned to the groups 40 of the rendering devices 12, the assignment of the group keys 44 to the rendering devices 12 can be described as defining the membership of the groups 40.

The service keys 30 are valid across all the groups 40, so for example, the service key 38 (FIG. 2) is valid for service 1 in service key period 1 in EPOCH1 for all the groups 40.

The membership of the groups 40 is typically dynamic and not static, so that in different epochs 32, the rendering devices 12 are grouped differently so that at least one rendering device 12 is not in the same group 40 in two successive epochs 32. The choice of which of the rendering devices 12 is assigned to which group 40 from epoch to epoch is described in more detail with reference to FIGS. 4a and 4b.

Each rendering device 12 has a unique device ID 46 (FIG. 5) and an associated unique user key 48. The device IDs 46 of the rendering devices 12 may be public knowledge among the users of the rendering devices 12, whereas each user key 48 is typically confidential to each user and possibly the system administrator of the key distribution system 10.

Grouping can be performed by performing a function 50 on the device ID 46 and/or the user key 48. In certain implementations, it is appreciated that using the user key 48 is actually stronger than using the device ID 46, as the device ID 46 is typically better ordered than the user key 48 and the device ID 46 may include less bits than the user key 48.

For instance, any device ID 46 having identical bits 7-14 may determine grouping in a first epoch 32. In a second epoch 32, grouping may be defined according to all subscribers having the same result of a Hash function with a random value and the device ID 46 (with the device ID 46 optionally being replaced with the user key 48) as input to the hash function. The Hash function could be any one of an appropriate family of Hash functions (such as, for example, SHA-1), with further different assignments being used for subsequent epochs 32. It is appreciated that any appropriate function may alternatively be used for grouping the rendering devices 12.

In choosing a suitable function 50 for grouping, it is appreciated that a desired property of grouping is that a specific user can not easily determine which other user or users are in the same group 40 as the specific user; to achieve such a result, a cryptographic hash function, such as SHA-1, is well suited. It is appreciated that, should the distribution of the device IDs 46 or the user keys 48 be non-uniform, some other appropriate function 50 may be more suited; persons skilled in the art would be able to choose an appropriate function 50.

More specifically, grouping can be done by any function that (more or less) uniformly distributes the population amongst the groups 40. A typical example might be:

group_id(ID)=hash(ID, seed) mod num_groups where: hash is some cryptographically strong hash function such as, for example, SHA-1; seed is a random or pseudo-random number; and num_groups is the number of desired groups 40 to be created.

The service keys 30 are first encrypted with the group keys 44 and then a plurality of period master keys 52 as will be described below.

The encryption module 22 (FIG. 1) is operative to encrypt (block 58), for each epoch 32, each service key 30 in the batch 28 of the service keys 30 with each of the group keys 44 as an encryption key 56, such that each service key 30 is individually encrypted (block 58) with a different group key 44 as the encryption key 56, yielding a plurality of group-key-encrypted service keys 54 from each service key 30.

In other words, each group-key-encrypted service key 54 is the result of encrypting (block 58) one of the service keys 30 using one of the group keys 44 as the encryption key 56. There is typically a resulting group-key-encrypted service key 54 for all the combinations of the service keys 30 and the group keys 44.

So for example, the service key 38 ("S1-SP1-E1" of FIG. 2) is encrypted with GK-1 yielding "S1-SP1-E1 [GK-1]" as the group-key-encrypted service key 54, "S1-SP1-E1" is encrypted with GK-2 yielding "S1-SP1-E1[GK-2]" etc.

It should be noted that securing the service keys 30 for individual devices 12 using the user keys 48 is possible but would likely incur a high transmission overhead, whereas securing the service keys 30 by the group keys 44 of the rendering devices 12 is generally more efficient for transmission purposes (bandwidth and bit rate) as there are less groups 40 than there are rendering devices 12. Therefore, grouping the rendering devices 12 devices together and encrypting the service keys 30 with the group keys 44 as described above for each group 40 is generally more efficient.

The group-key-encrypted service keys 54 are further protected with the period master keys 52 as will now be described below.

The period master key module 20 (FIG. 1) is typically operative to provide a different period master key 52 for each service key period 34 (FIG. 2) such that the period master key 52 for any one service key period 34 is the same across all groups 40 and across all services 36 (FIG. 2). FIG. 3 shows by way of example only the period master key 52 for service key period 1 in EPOCH1 labeled "MK-SP1-E1".

The encryption module 22 (FIG. 1) is typically operative to further encrypt (block 62) each group-key-encrypted service key 54 using, as an encryption key 60, the period master key 52 of the service key period 34 (FIG. 2) of the group-key-encrypted service key 54 being encrypted. The encryption of the group-key-encrypted service keys 54 yields a doubly-encrypted service key 64, first encrypted by one of the group keys 44 and then encrypted by a relevant one of the period master keys 52. So for example, the group-key-encrypted service key "S1-SP1-E1[GK-1]" is encrypted with MK-SP1-E1, the period master key 52 for service key period 1, yielding "S1-SP1-E1[GK-1, MK-SP1-E1]".

As described briefly with reference to FIG. 2, the service keys 30 are typically encrypted and bundled together for distribution to the rendering devices 12. In fact, the rendering devices 12 typically receive the doubly-encrypted service key 64 for many service key periods 34 (FIG. 2), typically a whole epoch, at one time. However, as will be described in more detail with reference to FIG. 7, each period master key 52 is distributed to the rendering devices 12 just before, or at the beginning of, the relevant service key period 34 of each period master key 52 thereby allowing the rendering devices 12 to recover the service keys 30 based on the relevant period master key 52 and the relevant group key 44. Therefore, the rendering devices 12 cannot generally recover each service key 30 until just before, or from the beginning of, the service key period 34 relevant to each service key 30.

As will be described below, the group keys 44 of each epoch 32 are encrypted for each rendering device 12 using the associated user key 48 for each rendering device 12. As each rendering device 12 is associated with one of the group keys 44, the user key 48 of each rendering device 12 is associated with one of the group keys 44. The encryption module 22 (FIG. 1) is operative to encrypt (block 70), for each rendering device 12, the group key 44 of the rendering device 12 using the user key 48 of the rendering device 12 as an encryption key 68, yielding a user-key-encrypted group key 66 for each rendering device 12.

In the example of FIG. 3, GK-1, the group key for group 1, is encrypted using user key UK-2 of device 2. GK-1, the group key for group 1, is also encrypted using user key UK-3 of device 3 etc.

It is appreciated that in practice a large multiplicity of rendering devices 12 such as, for example, hundreds of thousands or millions of rendering devices 12 may be used; a relatively small number of rendering devices 12 are shown in FIG. 3 for simplicity of depiction.

Reference is again made to FIG. 4a, which is a partly pictorial, partly block diagram view of group assignment in the first epoch 42 in the system 10 of FIG. 1.

As described above with reference to FIG. 3, the rendering devices 12 are typically assigned to different groups 40 in different epochs 32.

Grouping the rendering devices 12 differently in different epochs 32 may be advantageous for many reasons for example, but not limited to, preventing long-term collusion between group members, dealing with the problem of revoking individual devices, and identifying a suspected traitor device 72, who is for example illegally distributing keys 74.

Reference is now made to FIG. 4b, which is a partly pictorial, partly block diagram view of group assignment in a second epoch 76 in the system 10 of FIG. 1.

In the second epoch 76, the rendering devices 12 are assigned to the groups 40 differently than in the first epoch 42 of FIG. 4a.

In the first epoch 42 (FIG. 4a), the keys 74 were being distributed from group 1. In the second epoch 76, the keys 74 are being distributed from group 2. Therefore, the device(s) in both: group 1 in the first epoch 42; and in group 2 in the second epoch 76, are suspected as being the traitor(s) 72.

Therefore, the traitor identifier 26 (FIG. 1) is operative to identify the traitor device 72 of the rendering devices 12 based on the traitor device 72 distributing the keys 74. The keys 74 may be group keys 44 (FIG. 3) or service keys 30 (FIG. 3), encrypted or in the clear.

It should be noted that the suspected traitor 72 may be identified based on a single epoch. For example, a device which is suspected of illegal behavior may be assigned to one group 40 and then observed for illegal behavior while assigned to the group 40.

Reference is now made to FIG. 5, which is a partly pictorial, partly block diagram view showing the distribution of a plurality of key packages 78 with direct addressing in a current epoch 80 (December 2009 Epoch) prior to the start of a new epoch (EPOCH1 January 2010) in the system 10 of FIG. 1.

For each epoch 32, the delivery module 24 (FIG. 1) is typically operative to package all the doubly-encrypted service keys 64 and all the user-key-encrypted group keys 66 of the new epoch in one or more key packages 78. As described above with reference to FIG. 3, the doubly-encrypted service keys 64 are the group-key-encrypted service keys 54 encrypted with the relevant period master key 52 for the batch 28 of the service keys 30 of the new epoch. As described above with reference to FIG. 3, the user-key-encrypted group keys 66 are the group keys 44 encrypted in the form of the user-key-encrypted group keys 66 for the new epoch.

For each epoch 32, the delivery module 24 (FIG. 1) is typically operative to package the doubly-encrypted service keys 64 and the user-key-encrypted group keys 66 in the key packages 78 so that the doubly-encrypted service keys 64 and the user-key-encrypted group keys 66 are packaged according to groups 40, so that each of the key packages 78 is designated for the keys 64, 66 of one of the groups 40. Each group 40 may have one or more key packages 78 for the keys 64, 66 of that group 40.

The key packages 78 may be any suitable package, for example, but not limited to, an entitlement management messages or an entitlement control message or any suitable message.

In accordance with an alternative embodiment of the present invention, the doubly-encrypted service keys 64 and the user-key-encrypted group keys 66 are packaged in separate key packages.

For each epoch 32, the delivery module 24 (FIG. 1) is typically operative to distribute the user-key-encrypted group keys 66 in the key packages 78 with a unique identification, typically the device ID 46, identifying the rendering devices 12 associated with the user-key-encrypted group keys 66. Therefore, when the key packages 78 are received by the rendering devices 12, each rendering device 12 can find the appropriate user-key-encrypted group key 66 based on the accompanying device ID 46.

Identifying the user-key-encrypted group key 66 using the device ID 46 has been termed "direct addressing" where the message includes a list of addresses of the rendering devices 12. Direct Addressing, while being simple for the rendering devices 12 and the key distribution system 10, has several important drawbacks. First, including a list of addresses increases the size of the message in proportion to the size of the group, thereby increasing transmission overhead requirement. For example, if each address takes 4 bytes of space, and the group size is 20, addressing will take 80 bytes of space in the message. Second, including a list of addresses can aid hackers that are trying to collaborate with each other to illegally distribute keys. Another method of addressing described herein as "indirect addressing" is described with reference to FIG. 6 later on.

Additional features of the direct addressed key packages 78 are now described below.

In order to secure the key packages 78, the epoch module 14 (FIG. 1) is operative to provide a different epoch key 84 for each epoch 32. For each epoch 32, the encryption module 22 (FIG. 1) is operative to encrypt each key package 78 with the epoch key 84 of the next epoch for all the groups 40.

An advantage of encrypting the information in the key packages 78 with the epoch key 84 is that the key package 78 may be sent in advance, including well in advance (such as, for example, one or more days in advance) of the beginning of the new epoch, but the key information remains completely inaccessible to any recipient thereof until the epoch key 84 is distributed. In this way, unauthorized pre-distribution of the contents of the key information to unauthorized recipients is prevented.

In order for the rendering devices 12 to be able to identify the key packages 78 containing the doubly-encrypted service key 64 and the user-key-encrypted group keys 66 for the relevant group 40, the delivery module 24 (FIG. 1) is operative to include an identification 86 in the key packages 78 identifying the group 40 associated with each key package 78.

In an alternative embodiment of the present invention, the key packages 78 are not labeled with the group identification 86, so that each rendering device 12 might need to examine each key package 78 until the rendering device 12 has found the user-key-encrypted group key 66 entry appropriate for that device 12.

The delivery module 24 (FIG. 1) is typically operative to distribute the key packages 78 to the rendering devices 12 in the current epoch 80, before the beginning of the new epoch. All the doubly-encrypted service keys 64 for the whole new epoch are typically sent in the current epoch 80, before the beginning of the new epoch. However, it will be appreciated by those ordinarily skilled in the art that some of the doubly-encrypted service key 64 may be sent during the new epoch in one or more bundles at different times.

The key packages 78 are typically broadcast and therefore available to all the rendering devices 12, even the rendering devices 12 which do not need the key packages 78 unrelated to their group 40. However, it will be appreciated by those ordinarily skilled in the art that the key packages 78 for different groups 40 could be targeted to the rendering devices 12 of the different groups 40.

If services are added/amended in the middle of any epoch 32, the doubly-encrypted service keys 64 associated with the added/amended services may be distributed in additional key packages 78 by the delivery module 24 (FIG. 1) as necessary.

The rendering devices 12 receive the doubly-encrypted service keys 64 and the user-key-encrypted group keys 66 in the encrypted key packages 78. The rendering devices 12 store all the received encrypted key packages 78 (block 88) for later use as described with reference to FIGS. 7 and 8.

Figure 6:
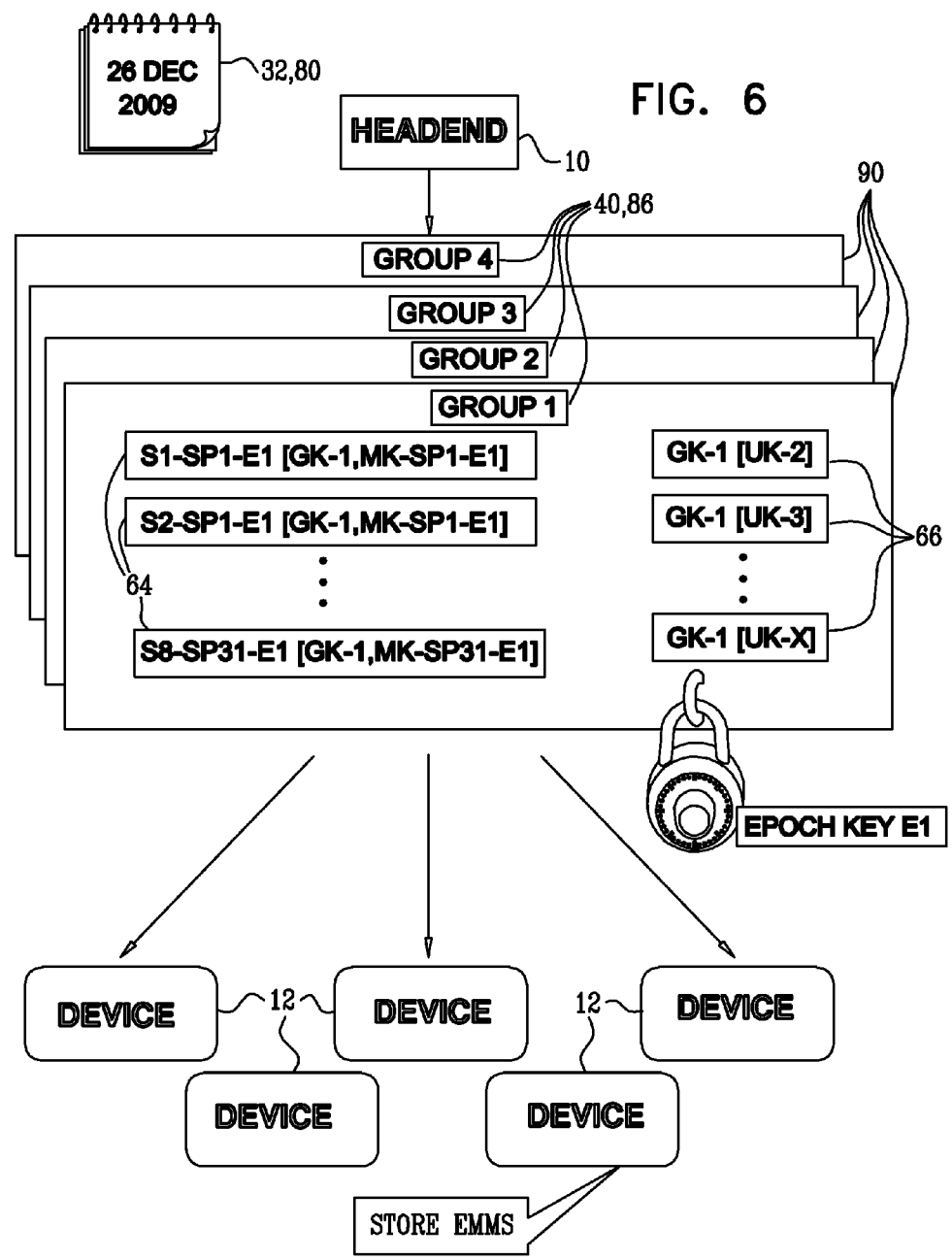
FIG. 6 is a partly pictorial, partly block diagram view showing the distribution of key packages with indirect addressing prior to the start of an epoch in the system of FIG. 1.

Reference is now made to FIG. 6, which is a partly pictorial, partly block diagram view showing the distribution of key packages 90 with indirect addressing in a current epoch 80 (December 2009 Epoch) prior to the start of the new epoch (January 2010 Epoch) in the system 10 of FIG. 1.

The key packages 90 are prepared by the delivery module 24 (FIG. 1) in substantially the same way as the key packages 78 of FIG. 5 except for the differences described below.

The delivery module 24 (FIG. 1) is operative to distribute user-key-encrypted group keys 66 without identifying the rendering devices 12 associated with the user-key-encrypted group keys 66 such that the rendering devices 12 need to identify which user-key-encrypted group key 66 is associated with which rendering device 12 by trial and error decryption of the user-key-encrypted group keys 66. The rendering devices 12 compare the results of the trial and error decryption with some known criteria, described in more detail with reference to FIG. 7.

If the key packages 90 are not labeled with the group identification 86, each rendering devices 12 might need to perform trial and error decryption of all the user-key-encrypted group keys 66 of each key package 90 until the correct user-key-encrypted group key 66 is found.

Indirect addressing may help reduce collaboration between group members.

It is possible to incorporate both direct addressing (described with reference to FIG. 5) and indirect addressing together in the same key distribution system 10. For example, if the key package 90 for a group 40 is full, surplus user-key-encrypted group keys 66 may be added to a direct addressed key package 78 (FIG. 5). Surplus user-key-encrypted group keys 66 of different groups 40 may be included in the same direct addressed key package 78 (FIG. 5). Similarly, if a new user subscribes to the services of the key distribution system 10 in the middle of any epoch 32, a direct addressed key package 78 (FIG. 5) could be used to send the user-key-encrypted group keys 66 and typically the doubly-encrypted service keys 64 to the new user. The rendering devices 12 typically check the indirect addressed key packages 90 first for relevant keys and then the direct addressed key packages 78 are searched if the keys were not found in the key packages 90.

Figure 7:
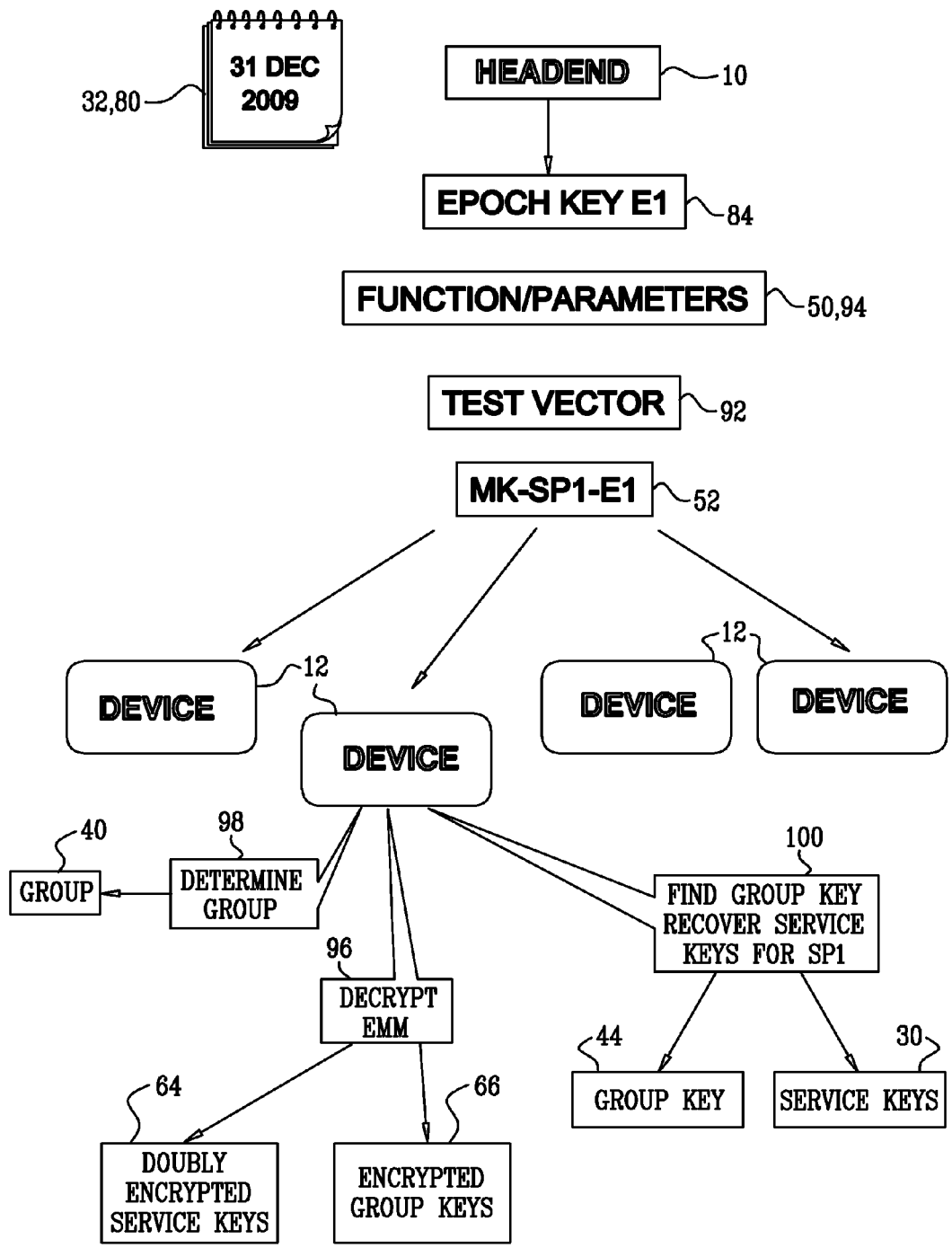
FIG. 7 is a partly pictorial, partly block diagram view showing the distribution of an epoch key, a period master key, a function/parameter and a test vector prior to the start of the epoch in the system of FIG. 1.

Reference is now made to FIG. 7, which is a partly pictorial, partly block diagram view showing the distribution of the epoch key 84 for the new epoch, the period master key 52 for the first service key period 34 (FIG. 2) of the new epoch, the function 50 and/or parameters 94 and a test vector 92 in the current epoch 80 (December 2009 Epoch), prior to the start of the new epoch (January 2010 Epoch), in the system 10 of FIG. 1.

The delivery module 24 (FIG. 1) is operative to distribute the epoch key 84 for the new epoch, the period master key 52 for the first service key period 34 (FIG. 2) of the new epoch, the function 50 and/or the parameters 94 and the test vector 92 in the current epoch 80, prior to the start of the new epoch, to the rendering devices 12 for receipt by the rendering devices 12. It will be appreciated that for security reasons the items 84, 52, 50, 94, 92 are typically not sent too early. The distribution typically occurs in the last service key period of the epoch 80 in order to give the rendering devices 12 enough time to receive the items 84, 52, 50, 94, 92 and recover the necessary keys prior to the start of the new epoch. It will be appreciated by those ordinarily skilled in the art that the items may be distributed earlier than the last service key period 34 if required for any reason.

The test vector 92 is verification data used in the process of determining the group 40 of each rendering device 12 when using "indirect addressing". If indirect addressing is not used, or the test vector 92 is not required to determine the group 40 of each rendering device 12, then the test vector 92 is not distributed by the delivery module 24 (FIG. 1).

The epoch key 84, the period master key 52, the function 50 and/or the parameters 94 and the test vector 92 may be distributed together in one message or distributed in separate messages typically in the clear without encryption. The messages may be any suitable message, for example, but not limited to, an entitlement control message (ECM) or an entitlement management message (EMM).

It will be appreciated by those ordinarily skilled in the art that an EMM is used by way of example only, and that the present invention is not limited to a particular type of security message, but rather includes any suitable message for providing security features such as entitlements, group keys and service keys.

Similarly, for each service key period 34 (FIG. 2) in the new epoch, the delivery module 24 (FIG. 1) is generally operative to distribute the period master key 52 for a particular service key period 34 (FIG. 2) in the service period 34 immediately prior to the particular service key period 34 and not before. However, it will be appreciated by those ordinarily skilled in the art that if for some reason it is advantageous to distribute the period master keys 52 before the immediately-prior service key period 34 then earlier distribution may also be performed.

In accordance with an alternative embodiment of the present invention, for each service key period 34 (FIG. 2) in the new epoch, the delivery module 24 (FIG. 1) is generally operative to distribute the period master key 52 for that service key period 34 (FIG. 2) not before the start of that service period 34. However, for practical reasons it will be appreciated that the period master key 52 should be delivered as early as possible in the service period 34.

It should be noted that all the distribution of keys and messages described herein are typically distributed a plurality of times to increase the likelihood that all the rendering devices 12 receive the keys and messages.

The receipt of the epoch key 84 enables the rendering devices 12 to decrypt the key packages 78, 90 (FIGS. 5 and 6) (block 96) revealing the doubly-encrypted service keys 64 and the user-key-encrypted group keys 66.

As described above with reference to FIG. 3, the function 50 may be used by the key distribution system 10 to determine the group 40 of each of the rendering devices 12. Similarly, each rendering device 12 may employ the received function 50 and/or the parameters 94 to determine the group 40 which that rendering device 12 belongs to (block 98).

The function 50 has the parameters 94. A new function 50 may be distributed to the rendering devices 12 each epoch 32. Alternatively, the same function 50 may be used for many epochs 32 while changing the parameters 94 of the function 50 each epoch 32. Therefore, the delivery module 24 (FIG. 1) is operative to distribute the function 50 and/or the parameters 94 of the function 50 in each epoch 32 to the rendering devices 12, depending on whether the function 50 is reused or not.

As described above with reference to FIG. 3, the function 50 may include a hash function. Additionally, the function 50 may be a function of the device ID 46 (FIG. 3) and/or the user key 48 (FIG. 3) of the rendering devices 12.

Once each rendering device 12 determines the group 40 it belongs to, each rendering device 12 may then find the key package(s) 78, 90 (FIGS. 5 and 6) of its group 40 assuming the key packages 78, 90 include the group identifications 86 (FIGS. 5 and 6).

If "direct addressing" is used, described with reference to FIG. 5, each rendering device 12 finds the relevant user-key-encrypted group key 66 (FIG. 5) by searching for the device ID 46 (FIG. 5) of the rendering device 12 in the group key list of the key package(s) 78 (FIG. 5) of the relevant group 40, assuming the key package(s) 78 include the group identifications 86 (FIG. 5). Otherwise, all the key packages 78 may need to be searched by the rendering device 12. Each rendering device 12 then decrypts the found user-key-encrypted group key 66 using the relevant user key 48 (FIG. 3), as the decryption key, in order to obtain the new group key 44 for the rendering device 12 (block 100).

If "indirect addressing" is used, described with reference to FIG. 6, each rendering device 12 identifies which user-key-encrypted group key 66 is associated with that rendering device 12 by trial and error decryption of the user-key-encrypted group keys 66 in the group key list of the key package(s) 90 (FIG. 6) of the relevant group 40, assuming the key packages 90 include the group identifications 86 (FIG. 6). Otherwise, all the key packages 90 may need to be tested by the rendering device 12. Successful decryption may be determined using any appropriate method known in the art such as, for example and without limiting the generality of the foregoing: determining whether a hash or checksum (not shown) associated with the decrypted group key 44 is correct; or checking a result of the trial and error decryption against verification data, for example, but not limited to, the test vector 92; or checking the result of the trial and error decryption against a known pattern, for example, but not limited to, "01010110" at the end of the decrypted result. The "01010110" may then be discarded before using the decrypted result as the group key 44. It will be appreciated that the size of the pattern may depend on the actual number of groups.

Each rendering device 12 then recovers the service keys 30 for service key period 1 of the new epoch E1 by decrypting the relevant doubly-encrypted service keys 64 using: the period master key 52 for service key period 1; and the group key 44, as decryption keys. Service keys of other service key periods in the new epoch E1 cannot be recovered until the relevant period master keys 52 are received.

Figure 8:
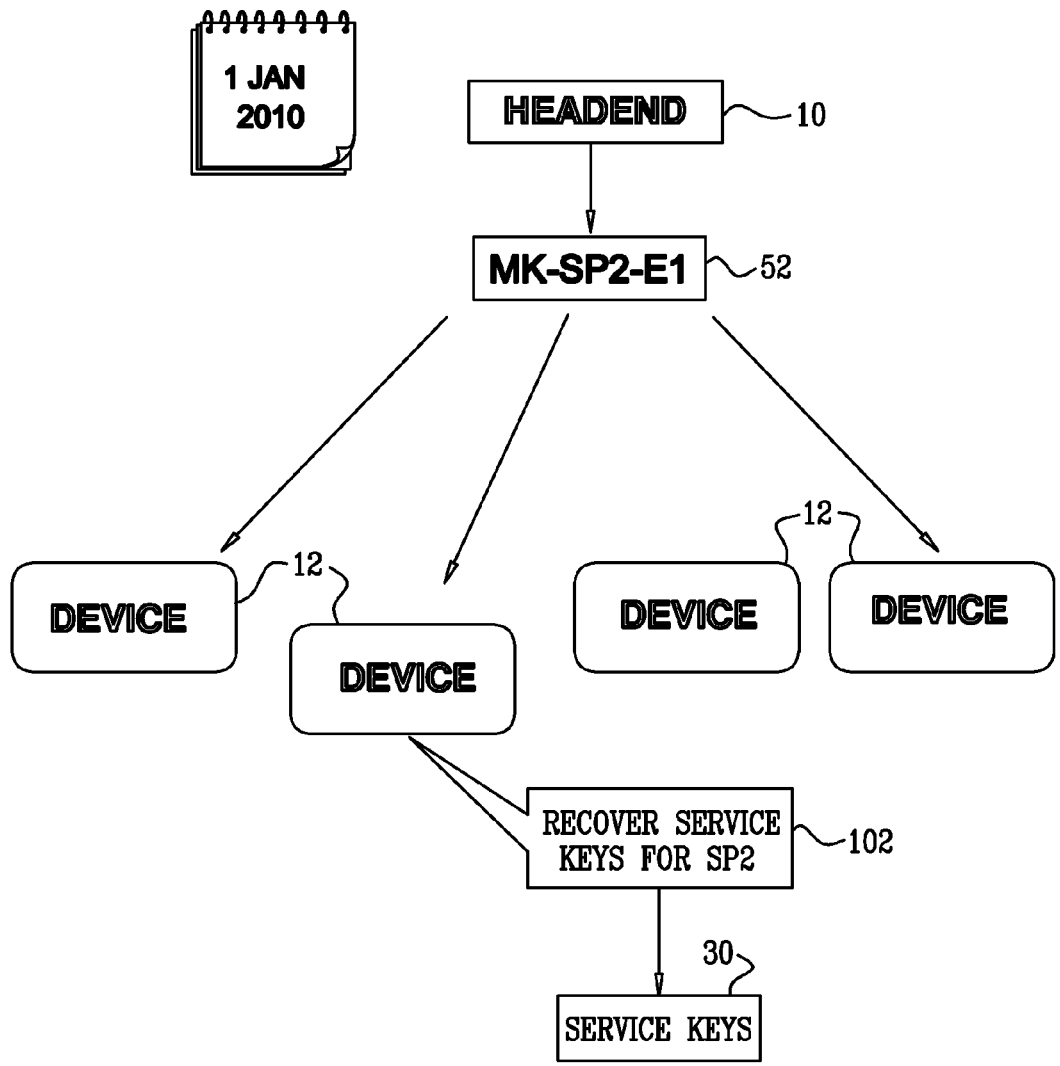
FIG. 8 is a partly pictorial, partly block diagram view showing the distribution of a period master key during the epoch in the system of FIG. 1.

Reference is now made to FIG. 8, which is a partly pictorial, partly block diagram view showing the distribution of the period master key 52 for the second service key period 34 (FIG. 2) during the new epoch in the system 10 of FIG. 1.

The period master key 52 for the second service key period 34 (FIG. 2) of the new epoch E1 is distributed to the rendering devices 12 by the key distribution system 10 on the 1st of Jan. 2010 which is service key period 1.

Each rendering device 12 then recovers the service keys 30 for service key period 2 of new epoch E1 by decrypting the relevant doubly-encrypted service keys 64 (FIGS. 5, 6, 7) using: the period master key 52 for service key period 2; and the group key 44 (FIG. 7), as decryption keys (block 102).

Figure 9:
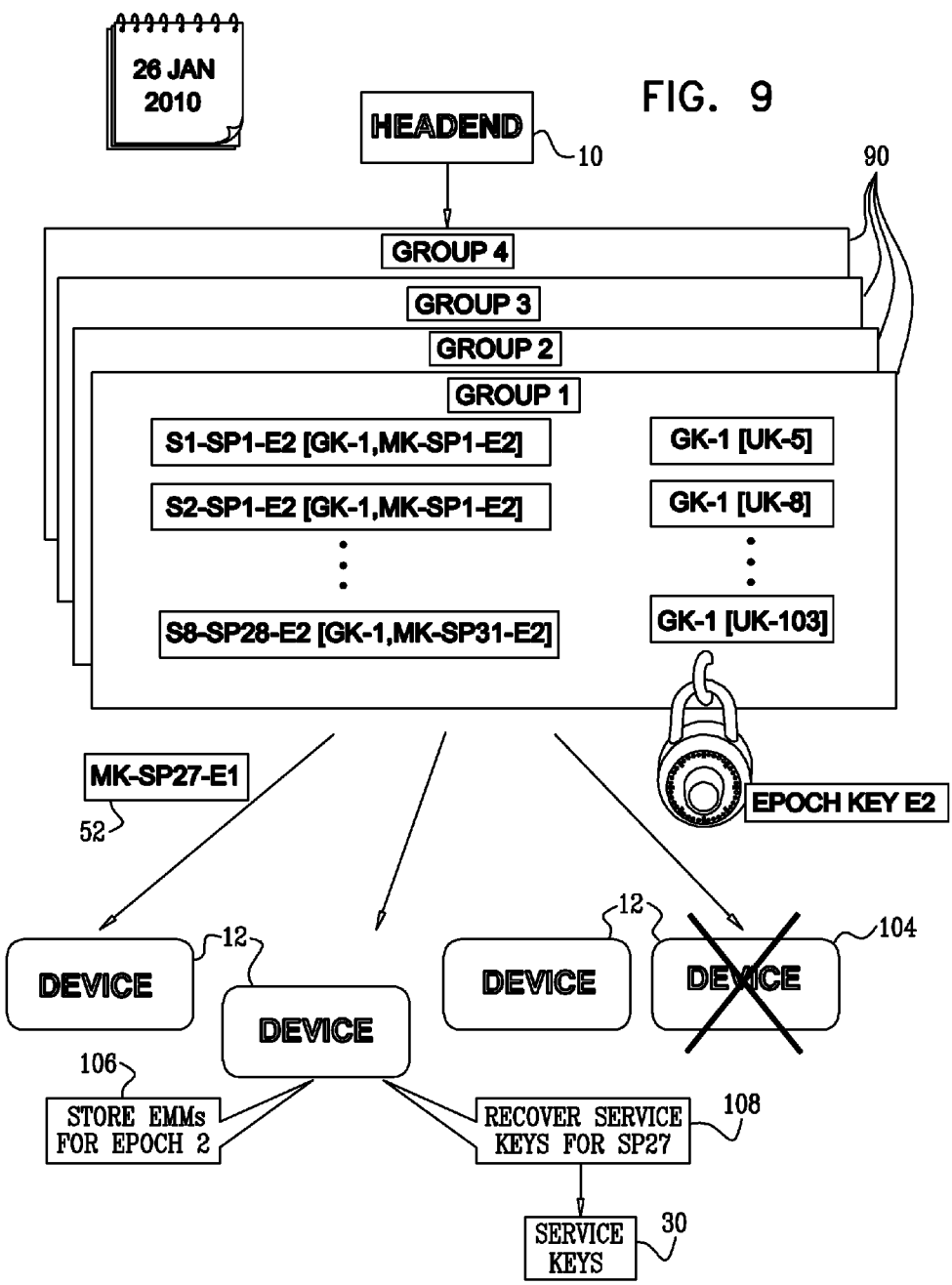
FIG. 9 is a partly pictorial, partly block diagram view showing the distribution of key packages prior to the start of the next epoch in the system of FIG. 1.

Reference is now made to FIG. 9, which is a partly pictorial, partly block diagram view showing the distribution of the key packages 90 for the next epoch (epoch E2—February 2010) prior to the start of the next epoch in the system 10 of FIG. 1. FIG. 9 also shows the distribution of the period master key 52 for service period 27 of epoch E1.

The key packages 90 for the next epoch E2 are distributed on the 26 Jan. 2010 to the rendering devices 12. The rendering devices 12 receiving the key packages 90 store the key packages 90 (block 106).

Additionally, the rendering devices 12 recover the service keys 30 for service key period 27 of the epoch E1 by decrypting the relevant doubly-encrypted service keys 64 (FIGS. 5, 6, 7) using: the period master key 52 for service key period 27; and the group key 44 (FIG. 7), as decryption keys (block 108).

However, a rendering device 104 is not activated during the key distribution of the 26 Jan. 2010 and thereby does not receive the key packages 90.

Figure 10:
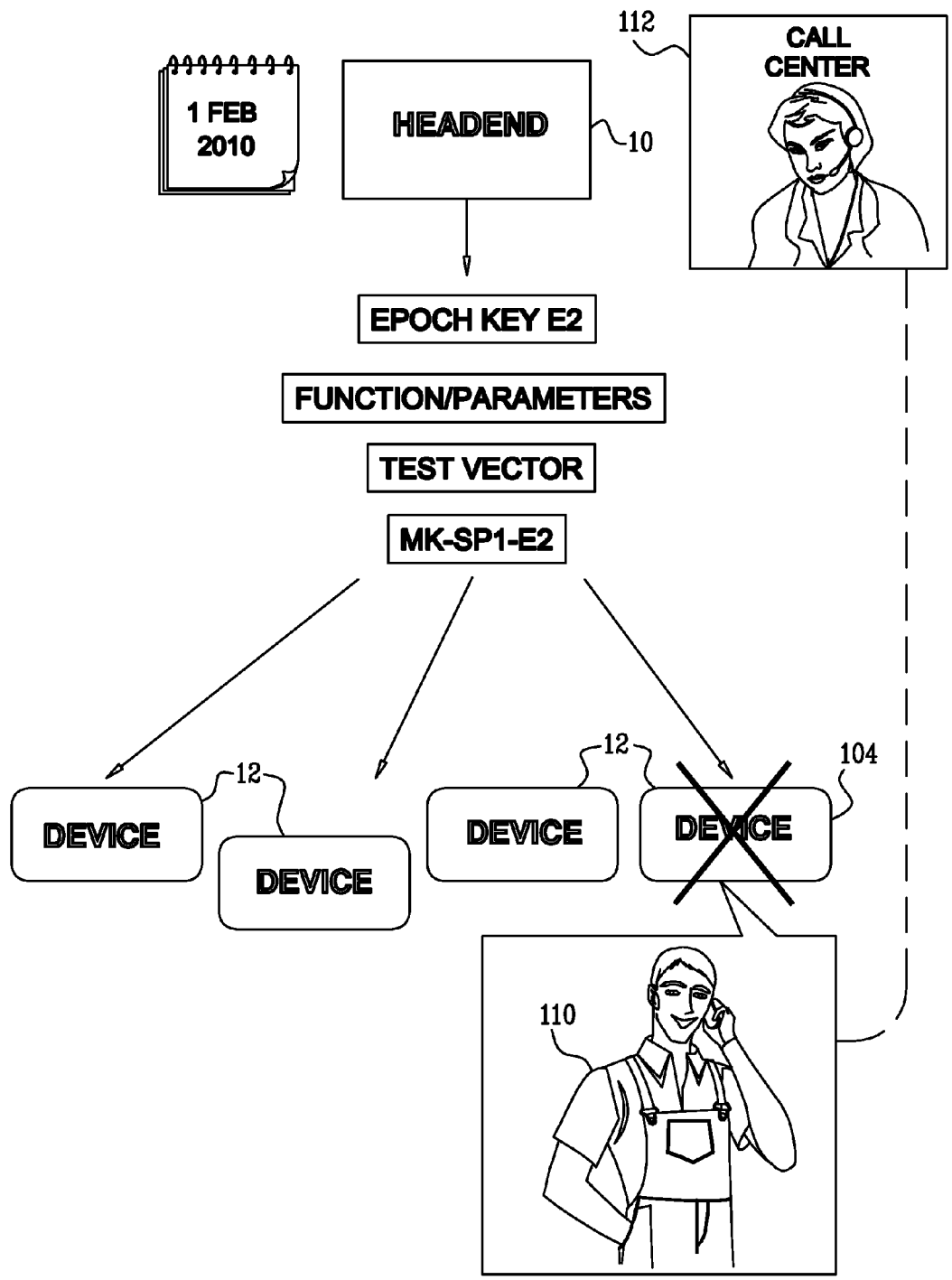
FIG. 10 is a partly pictorial, partly block diagram view showing a user contacting a call center at the start of the next epoch for the delivery of missed keys in the system FIG. 1.

Reference is now made to FIG. 10, which is a partly pictorial, partly block diagram view showing a user 110 contacting a call center 112 at the start of the epoch E2 for the delivery of missed keys in the system 10 FIG. 1.

At the beginning of epoch E2 (1 Feb. 2010) the user 110 cannot play content as the rendering device 104 did not receive the key packages 90 (FIG. 9) for epoch E2. The user calls the call center 112, servicing the key distribution system 10, to request the missing key packages 90 to be delivered to the rendering device 104. The missing key packages 90 may be sent by any suitable communication system for example, but not limited to, cable, satellite, Internet or via a return-path of the rendering device 104.

If too many of the rendering devices 12 do not receive the key packages 90 (FIG. 9), then the call center 112 may become overloaded with users calling the call center 112 at the beginning of the epoch E2. Additionally, the rendering devices 12 missing the key packages 90 may have to wait an unacceptable amount of time in order to receive the missing key packets.

Figure 11:
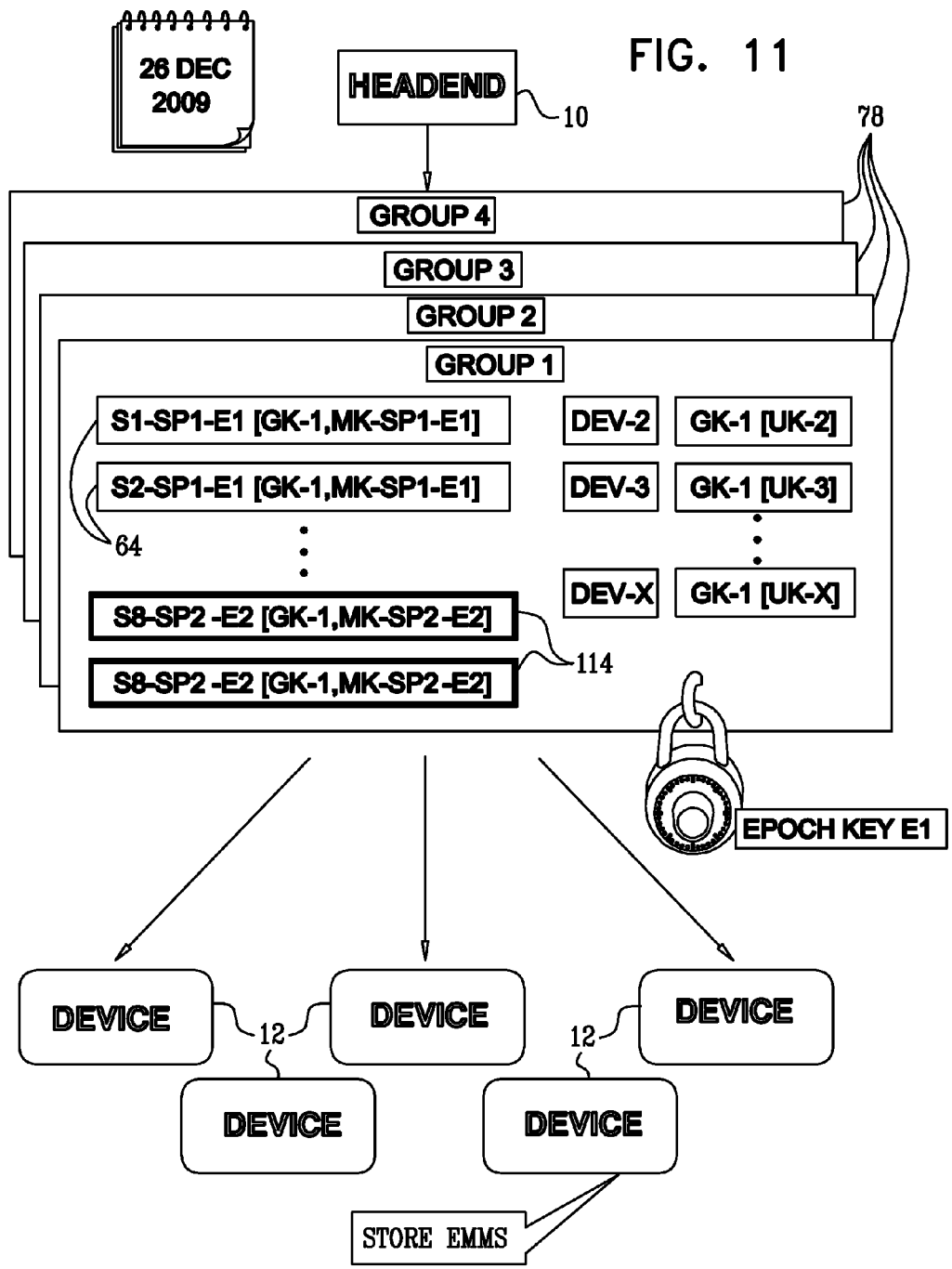
FIG. 11 is a partly pictorial, partly block diagram view showing the distribution of key packages with grace period service keys in the system of FIG. 1.

Reference is now made to FIG. 11, which is a partly pictorial, partly block diagram view showing the distribution of the key packages 78 with grace period doubly encrypted service keys 114 in the system 10 of FIG. 1.

One solution to minimizing call center overload at the beginning of an epoch is for the delivery module 24 (FIG. 1) to include one or more additional (grace period) doubly encrypted service keys 114 in addition for to the doubly-encrypted service key 64 in the key packages 78 so as to provide a grace period for content access after the end of the one epoch. The doubly-encrypted service keys 64 delivered on the 26 Dec. 2009 are for the coming epoch, in the example of FIG. 1, EPOCH1—January 2010. The additional doubly encrypted service keys 114 are for the beginning of the epoch after the coming epoch. In other words, the additional doubly encrypted service keys 114 are for EPOCH2—February 2010. Therefore, at the beginning of EPOCH2, the rendering devices 12 should already have the additional doubly encrypted service keys 114.

Figure 12:
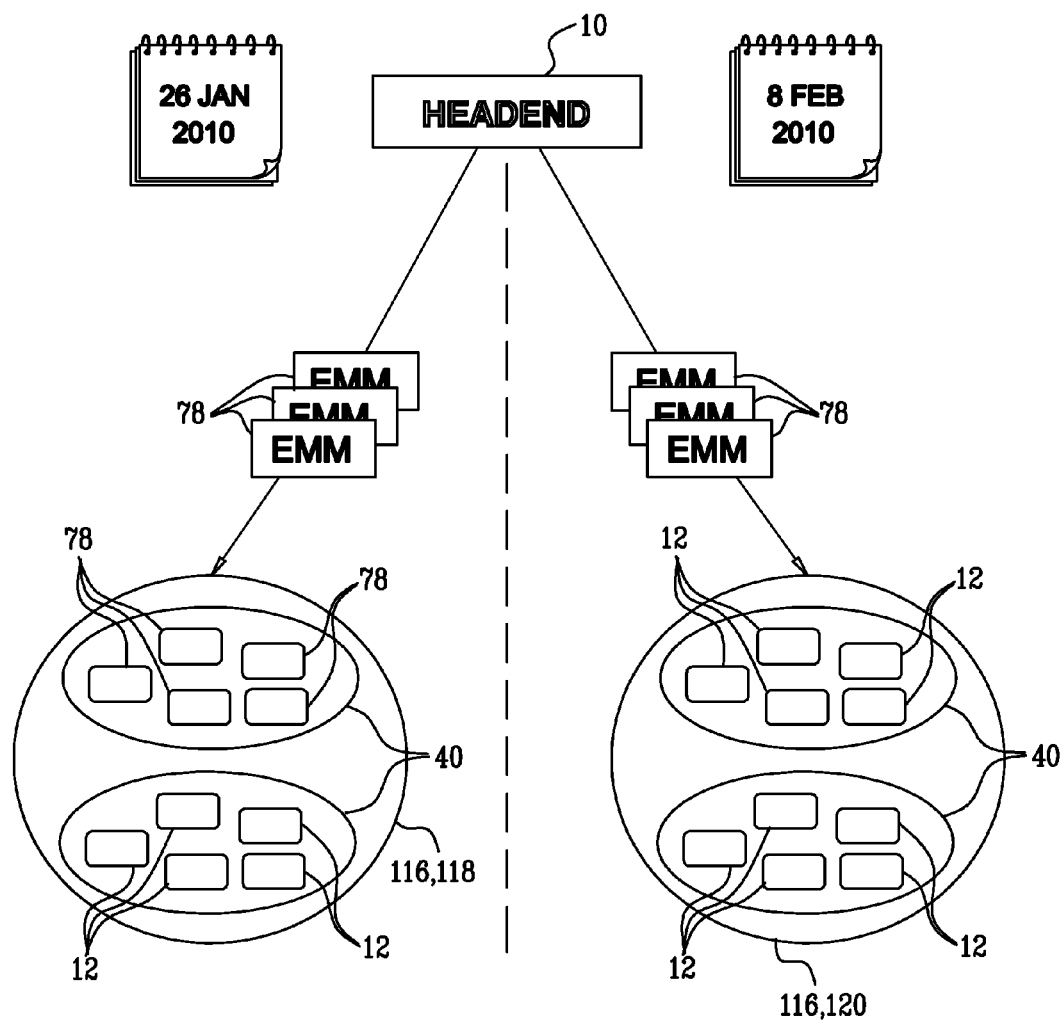
FIG. 12 is a partly pictorial, partly block diagram view showing a plurality of supergroups having different epoch start dates in the system of FIG. 1.

Reference is now made to FIG. 12, which is a partly pictorial, partly block diagram view showing a plurality of supergroups 116 having different epoch start dates in the system 10 of FIG. 1.

In accordance with an alternative embodiment of the present invention, the groups 40 of the rendering devices 12 may grouped together into the supergroups 116 by the group module 18 (FIG. 1). The supergroups 116 allow different groups of the rendering devices 12 to be treated differently, for example for key distribution purposes, as will be described below in more detail.

One application of using the supergroups 116 is to prevent call center overload by staggering the start dates of the epochs of the different supergroups 116 so that the start date of an epoch for some rendering devices 12 is different from the start date of an epoch for other rendering devices 12.

In FIG. 12, the start date of the epoch for the rendering devices 12 in a supergroup 118 is the 1st of each month, therefore FIG. 12 shows the key packages 78 for the rendering devices 12 of the supergroup 118 being distributed on the 26th of January 2010. On the other hand, the start date of the epoch for the rendering devices 12 in a supergroup 120 is the 15th of each month, therefore FIG. 12 shows the key packages 78 for the rendering devices 12 of the supergroup 120 being distributed on the 8th of February 2010. Therefore, the epochs of different groups 40 of the rendering devices 12 have different start dates according to which supergroups 116 the groups 40 are in.

The epoch module 14 (FIG. 1) is typically operative to provide the epochs for the supergroups 116 so that the epochs commence on different start dates for different supergroups 116 and therefore different groups 40. Therefore, the epochs for different supergroups 116 include different service key periods 34 (FIG. 2).

The service keys 30 (FIG. 2) are the same for all the supergroups 116 for the same service key period 34 (FIG. 2). In other words, any service key 30 (FIG. 2) for a particular service key period 34 (FIG. 2) and service 36 (FIG. 2) is the same across all the groups 40 and all the supergroups 116. However, as the epochs of the different supergroups 116 include different service key periods 34, the service key module 16 (FIG. 1) is operative to provide different batches of the service keys 30 associated with the different service key periods 34 (FIG. 2) of the different epochs of the supergroups 116.

The period master key 52 (FIG. 3) for any particular service key period 34 is the same for all services 36 across all the groups 40 and all the supergroups 116.

The group module 18 (FIG. 1) is typically operative to provide group keys 44 (FIG. 3) for the rendering devices 12 of all the supergroups 116, for each epoch of the different supergroups 116, thereby defining the groups 40 of each supergroup 116. The rendering devices 12 in each supergroup 116 are typically grouped differently in different epochs while generally remaining in the same supergroup 116.

The encryption of the group keys 44 (FIG. 3) and the service keys 30 (FIG. 2) is typically performed in the substantially the same way as described above with reference to FIG. 3, while allowing for the different start dates of the different epochs of the different supergroups 116.

The delivery module 24 (FIG. 1) is typically operative to package and distribute the key packages 78 in substantially the same way as described with reference to FIG. 5, except that the key packages 78 for different supergroups 116 having different epoch start dates will generally be distributed at different times.

Reference is now made to FIG. 13, which is a partly pictorial, partly block diagram view showing the supergroups 116 having different user characteristics in the system 10 of FIG. 1.

Each rendering device 12 has a user 122 with one or more user characteristics. The group module 18 is operative to group together the rendering devices 12 into the supergroups 116 according to one or more user characteristics of the user of each rendering device 12. As described with reference to FIG. 12, each of the supergroups 116 includes a number of the groups 40. The provision of the groups 40 in each supergroup 116 and the group keys 44 (FIG. 3) has already been described with reference to FIG. 3.

FIG. 13 shows a user 124 who is a student and a user 126 who is a taxi driver. The user 124 is grouped together with other students in a supergroup 128. The user 126 is grouped together with other taxi drivers in a supergroup 130. The rendering devices 12 of the students are assumed to be powered up for receiving keys during daytime hours. The rendering devices 12 of the taxi drivers are assumed to be powered up most of the day including most, or all, of the night.

In order to efficiently distribute the key packages 78, the delivery module 24 (FIG. 1) is optionally operative to distribute the key packages 78 to the supergroups 128, 130 each epoch (periodically) according to different delivery schedules, for example, but not limited to, distributing the key packages 78 to: the rendering devices 12 of the supergroup 128 of the students during the day and possibly the evening; and the rendering devices 12 of the supergroup 130 of the taxi drivers late at night and in the early hours of the morning The delivery module 24 (FIG. 1) may distribute the key packages 78 to the supergroups 128, 130 each epoch (periodically) according to different delivery frequencies so that the delivery frequency to one supergroup 116 is higher than the delivery frequency to another supergroup 116.

The supergroups 116 described with reference to FIG. 13 may, or may not, have staggered epochs as described with reference to FIG. 12.

It will be appreciated that one or more of the rendering device(s) 12 may be transferred from one supergroup 116 to another supergroup 116. In such a case, a special key message is generally required to deliver missing keys 64, 66 (FIG. 5) to the transferred rendering device(s) 12 if needed, typically based on report back from the rendering device(s) 12 of when the key packages 78 were received.

It will be appreciated that the advantages of the supergroups 116 described with reference to FIGS. 12 and 13, such as staggering epochs, grouping by user characteristic and using different delivery schedules and/or frequencies for different supergroups 116 may also be implemented for the groups 40 without using the supergroups 116. So for example, epochs between different groups 40 could be staggered, the rendering devices 12 could be assigned to the groups 40 based on user characteristics and different delivery schedules and/or frequencies could be applied to different groups 40.

The term "supergroup" as used in the specification and claims, is used to describe a group having subgroups of rendering devices 12. Therefore the term "subgroup key" used in the claims is the same as the group key 44 (FIG. 3). Additionally, the term "group" as used in the claims is defined as either: a group within a supergroup; a group without a supergroup and without subgroups; or a supergroup, unless the context of a claim makes it clear that a "group" is a group of a supergroup.

For clarity purposes, only a small number of the rendering devices 12 are shown in FIGS. 12 and 13 per group 40. Similarly, only two groups 40 are shown per supergroup 116 and only two supergroups are shown in FIGS. 12 and 13. It will be appreciated by those ordinarily skilled in the art that the number of the rendering devices 12 per group 40 can be any suitable number, the number of groups 40 per supergroup 116 can be any suitable number, and the number of supergroups can be any suitable number. The number of the rendering devices 12 per group 40, the number of groups 40 per supergroup 116 and the number of supergroups is typically dependent on many factors, for example, but not limited to, security, processing and transmission considerations. For example, a small number of large groups 40 require less processing to produce the doubly-encrypted service keys 64 (FIG. 3) as well as less bandwidth to distribute the doubly-encrypted service keys 64, whereas a large number of small groups 40 may provide better security to prevent collusion between fewer group members and easier tracking of traitors in the small groups 40. The number of supergroups 116 may depend on the decision to stagger the epochs and/or assign different users with different characteristic to different supergroups 116 for more efficient key distribution.

In general, the length of the epochs 32, duration of the service key periods 34, the number of services 36, the size of the groups 40 and the supergroups 116 may change over time.

It is appreciated that software components of the present invention may, if desired, be implemented in ROM (read only memory) form. The software components may, generally, be implemented in hardware, if desired, using conventional techniques. It is further appreciated that the software components may be instantiated, for example, as a computer program product; on a tangible medium; or as a signal interpretable by an appropriate computer.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A key distribution system for controlling access to content by a plurality of rendering devices, comprising computer processing machinery including:

an epoch processing machinery to provide a plurality of epochs, each of the epochs including a plurality of service key periods;

a service key processing machinery to provide a plurality of service keys so that, for each one of the epochs, a batch of the service keys is provided for employment in decryption of the content for a plurality of services across the service key periods of the one epoch such that a different one of the service keys in the batch is valid for each different combination of the services and the service key periods;

a group processing machinery to provide a plurality of group keys for each of the epochs such that: for each of the epochs, each of the rendering devices is assigned one of the group keys such that more than one of the rendering devices may be assigned a same one of the group keys; for each of the epochs, the assignment of the group keys groups together the rendering devices having the same one group key, thereby defining a plurality of groups; each of the service keys is valid across all the groups; and in different ones of the epochs, the rendering devices are grouped differently thereby facilitating traitor tracing;

a period master key processing machinery to provide for each one of the service key periods in the one epoch a different period master key;

an encryption processing machinery to encrypt, for each of the epochs, each of the service keys, in the batch of the service keys with each of the group keys, such that each of the service keys is individually encrypted with a different one of the group keys yielding a plurality of group-key-encrypted service keys from each of the service keys the encryption processing machinery being configured to further encrypt each one of the group-key-encrypted service keys using the period master key of the one service key period; and a delivery processing machinery to: (a) distribute to the rendering devices for each one of the epochs, the group-key-encrypted service keys for the batch of the service keys and the group keys of the one epoch; and (b) for each one of the service key periods, distribute the period master key for the one service key period to the rendering devices during the service key period immediately prior to the one service key period.

2. The system according to claim 1, wherein the delivery processing machinery is configured to distribute, for each one of the groups, the batch of the service keys of the one epoch to the rendering devices of the one group in at least one key package.

3. The system according to claim 2, wherein the delivery processing machinery is configured to include at least one additional service key of an epoch after the one epoch in the at least one key package so as to provide a grace period for content access after the end of the one epoch.

4. The system according to claim 2, wherein the delivery processing machinery is configured to distribute, for each one of the groups, the group keys of the one epoch to the rendering devices of the one group in the at least one key package.

5. The system according to claim 2, wherein the epoch processing machinery is configured to provide, for each one of the epochs, an epoch key, the encryption processing machinery being configured to encrypt, for each one of the groups, the at least one key package of the one group using the epoch key of the one epoch.

6. The system according to claim 2, wherein the delivery processing machinery is configured to include an identification in the at least one key package of the one group, the identification identifying the at least one key package of the one group as being associated with the one group.

7. The system according to claim 1, wherein the group processing machinery is configured to assign the group keys to the rendering devices randomly/pseudo-randomly.

8. The system according to claim 1, wherein:
the rendering devices are configured to determine to which of the groups the rendering devices belong by employing a function having parameters; and
the delivery processing machinery is configured to distribute the function or the parameters to the rendering devices.

9. The system according to claim 8, wherein the function includes a hash function.

10. The system according to claim 8, wherein the function is function of at least one of the following: a user key and a device ID.

11. The system according to claim 1, further comprising a traitor identifier to identify a traitor device of the rendering devices based on the traitor device distributing, at least one of the group-key-encrypted service keys or at least one of the group keys.

12. The system according to claim 1, wherein the period master key processing machinery is configured to provide the period master key for each one of the service key periods such that the period master key for the one service key period is the same across all of the groups and across all of the services.

13. The system according to claim 1, wherein:
each of the rendering devices is associated with a different user key;
the user key of each of the rendering devices is associated with one of the group keys;
the encryption processing machinery is configured to encrypt, for each one of the rendering devices, the one group key of the one rendering device using the user key of the one rendering device, yielding a user-key-encrypted group key for each of the rendering devices; and
the delivery processing machinery is configured to distribute to the rendering devices the user-key-encrypted group key of each of the rendering devices.

14. The system according to claim 13, wherein:
each of the rendering devices has a unique identification; and
the delivery processing machinery is configured to distribute at least some of the user-key-encrypted group keys with the unique identification identifying the rendering devices associated with the at least some user-key-encrypted group keys.

15. The system according to claim 13, wherein:
at least some of the user-key-encrypted group keys are associated with at least some of the rendering devices; and
the delivery processing machinery is configured to distribute the at least some user-key-encrypted group keys without identifying the at least some rendering devices of the at least some user-key-encrypted group keys such that the at least some rendering devices need to identify which one of the at least some user-key-encrypted group keys is associated with which one of the at least some rendering devices by trial and error decryption of the at least some user-key-encrypted group keys.

16. The system according to claim 15, wherein the delivery processing machinery is configured to distribute verification data to the at least some rendering devices, so that the at least some rendering devices check a result of the trial and error decryption against the verification data.

17. The system according to claim 1, wherein:
the group processing machinery is configured to create a plurality of supergroups, one of the supergroups including the plurality of groups for the rendering devices, another one of the supergroups including a plurality of other groups for a plurality of other rendering devices;
the group processing machinery is configured to provide a plurality of other group keys for each of the epochs thereby defining the other groups, in different ones of the epochs the other rendering devices are grouped differently;
the encryption processing machinery is configured to encrypt, for each of the epochs, each of the service keys in the batch of the service keys with each of the other group keys, such that each one of the service keys is individually encrypted with a different one of the other group keys yielding a plurality of other-group-key-encrypted service keys from each one of the service keys; and the delivery processing machinery is configured to distribute the other-group-key-encrypted service keys for the batch of the service keys and the other group keys of the one epoch to the other rendering devices according to a first delivery schedule.

18. The system according to claim 17, wherein: the delivery processing machinery is configured to distribute the group-key-encrypted service keys for the batch of the service keys and the group keys of the one epoch to the rendering devices according to a second delivery schedule; and the first delivery schedule is different from the second delivery schedule.

19. The system according to claim 18, wherein the first delivery schedule has a higher delivery, frequency than the second delivery schedule.

20. The system according to claim 1, wherein:
the group processing machinery is configured to create a plurality of supergroups, one of the supergroups including the plurality of groups for the rendering devices, another one of the supergroups including a plurality of other groups for a plurality of other rendering devices;
the epoch processing machinery is configured to provide a plurality of other epochs, each of the other epochs including a number of the service key periods, the epochs commencing according to a plurality of first start dates, the other epochs commencing according to a plurality of second start dates, the first start dates being different from the second start dates;
the service key processing machinery is configured to provide, for each of the other epochs, another batch of the service keys;
the group processing machinery is configured to provide a plurality of other group keys for each of the other epochs thereby defining the other groups, in different ones of the other epochs the other rendering devices are grouped differently;
the encryption processing machinery is configured to encrypt, for each of the other epochs, each of the service keys in the other batch of the service keys with each of the other group keys, such that each of the service keys of the other batch is individually encrypted with a different one of the other group keys yielding a plurality of other-group-key-encrypted service keys from each one of the service keys of the other batch; and
the delivery processing machinery is configured to distribute, for each one of the other epochs, the other-group-key-encrypted service keys for the other batch of the service keys and the other group keys of the one epoch to the other rendering devices.

21. A key distribution method for controlling access to content by a plurality of rendering devices by a server, the server performing acts comprising:
providing a plurality of epochs, each of the epochs including a plurality of service key periods;
providing a plurality of service keys so that, for each one of the epochs, a batch of the service keys is provided for employment in decryption of the content for a plurality of services across the service key periods of the one epoch such that a different one of the service keys in the batch is valid for each different combination of the services and the service key periods;
providing a plurality of group keys for each of the epochs such that: for each of the epochs, each of the rendering devices is assigned one of the group keys such that more than one of the rendering devices may be assigned a same one of the group keys; for each of the epochs, the assignment of the group keys groups together the rendering devices having the same one group key, thereby defining a plurality of groups; each of the service keys is valid across all the groups; and in different ones of the epochs, the rendering devices are grouped differently thereby facilitating traitor tracing;
providing for each one of the service key periods in the one epoch a different period master key;
encrypting, for each of the epochs, each of the service keys, in the batch of the service keys with each of the group keys, such that each of the service keys is individually encrypted with a different one of the group keys yielding a plurality of group-key-encrypted service keys from each of the service keys;
encrypting each one of the group-key-encrypted service keys using the period master key of the one service key period;
distributing to the rendering devices, for each one of the epochs, the group-key-encrypted service keys for the batch of the service keys and the group keys of the one epoch; and
for each one of the service key periods, distributing the period master key for the one service key period to the rendering devices during the service key period immediately prior to the one service key period.

* * * * *